(12) United States Patent
Zhang et al.

(10) Patent No.: US 11,012,203 B2
(45) Date of Patent: May 18, 2021

(54) METHOD AND DEVICE FOR WIRELESS COMMUNICATION IN UE AND BASE STATION

(71) Applicant: SHANGHAI LANGBO COMMUNICATION TECHNOLOGY COMPANY LIMITED, Shanghai (CN)

(72) Inventors: Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 123 days.

(21) Appl. No.: 16/388,886

(22) Filed: Apr. 19, 2019

(65) Prior Publication Data

US 2019/0327045 A1    Oct. 24, 2019

(30) Foreign Application Priority Data

Apr. 20, 2018   (CN) .......................... 201810358835.2

(51) Int. Cl.
*H04L 5/00* (2006.01)
*H04W 72/04* (2009.01)
*H04J 3/02* (2006.01)

(52) U.S. Cl.
CPC .............. *H04L 5/0023* (2013.01); *H04J 3/02* (2013.01); *H04W 72/046* (2013.01); *H04W 72/0446* (2013.01)

(58) Field of Classification Search
CPC ..... H04L 5/0023; H04J 3/02; H04W 72/0446; H04W 72/046
See application file for complete search history.

(56) References Cited

U.S. PATENT DOCUMENTS

| 2017/0105223 A1 | 4/2017 | Zhang et al. |
| 2019/0364617 A1* | 11/2019 | Wu ........................ H04W 24/10 |
| 2020/0304188 A1* | 9/2020 | Wu .................... H04W 72/1278 |

FOREIGN PATENT DOCUMENTS

| CN | 101646175 A | 5/2010 |
| CN | 103369539 A | 10/2013 |

(Continued)

OTHER PUBLICATIONS

CN 1st Office Action received in application No. 201810358835.2 dated May 18, 2020.

(Continued)

*Primary Examiner* — Melvin C Marcelo
(74) *Attorney, Agent, or Firm* — Maschoff Brennan

(57) ABSTRACT

The present disclosure provides a method and device for wireless communication in a user equipment and a base station. The user equipment receives a first information, and transmits a first wireless signal in a first time domain resource of a first sub-band. The first information is used to indicate a first parameter; the first parameter is associated with one of L spatial parameter sets; the L spatial parameter sets are respectively in one-to-one corresponding to L time domain resources; the first time domain resource is one of the L time domain resources. The L time domain resources belong to a first time window; the first information is used to determine the first time domain resource from the L time domain resources; the first parameter is used to determine a transmitting antenna port group of the first wireless signal.

20 Claims, 18 Drawing Sheets

(56) References Cited

FOREIGN PATENT DOCUMENTS

| | | |
|---|---|---|
| CN | 104349492 A | 2/2015 |
| WO | 2013170786 A | 11/2013 |
| WO | 2015196455 | 12/2015 |

OTHER PUBLICATIONS

CN 1st Search report received in application No. 201810358835.2 dated May 11, 2020.

\* cited by examiner a spatial parameter set of L spatial parameter sets

One time domain resource in L time domain resources

METHOD AND DEVICE FOR WIRELESS COMMUNICATION IN UE AND BASE STATION

CROSS REFERENCE TO RELATED APPLICATION

This application claims the priority benefit of Chinese Patent Application Serial Number 201810358835.2, filed on Apr. 20, 2018, the full disclosure of which is incorporated herein by reference.

BACKGROUND

Technical Field

The present disclosure relates to a transmission method and device in a wireless communication system, and more particularly to a method and device for supporting data transmitting on an unlicensed spectrum.

Related Art

In the traditional 3GPP (3rd Generation Partner Project) LTE (Long-term Evolution) system, data transmission can only occur on the licensed spectrum, but with the sharp increase of data transmission traffic, especially in some urban areas, licensed spectrum may be difficult to meet the demand for data transmission traffic. The communication on the unlicensed spectrum in Release 13 and Release 14 is introduced by the cellular system and used for the transmission of downlink and uplink data. In order to ensure compatibility with access technologies on other unlicensed spectrums, LBT (Listen Before Talk) technology is adopted by LAA (Licensed Assisted Access) of LTE to avoid interference caused by multiple transmitters occupying the same frequency resource at the same time.

The uplink transmission in the traditional LTE system is often based on the grant of the base station. In order to avoid the resource utilization degradation and delay caused by the frequent use of LBT, the AUL (Autonomous Uplink) transmission is introduced in the unlicensed spectrum in Release 15. In the AUL, the UE (User Equipment) can perform uplink transmission independently in the air interface resources pre-configured by the base station. At present, 5G NR (New Radio Access Technology) access technology for unlicensed spectrum is under discussion. Large-scale MIMO will be used on a large scale in 5G NR, and unlicensed spectrum grant-free uplink transmission needs to be reconsidered.

SUMMARY

Through the research, the inventors found that how to avoid frequent LBT in the uplink transmission on the unlicensed spectrum of the NR system, effectively realize the sharing of unlicensed spectrum resources by multiple UEs, and improve the transmission efficiency of unlicensed spectrum is a key problem to be solved.

In response to the above problems, the present disclosure discloses a solution. It should be noted that, in the case of no conflict, the features in the embodiments and the embodiments of the present disclosure may be combined with each other arbitrarily.

The present disclosure discloses a method for wireless communication in a user equipment, which includes:

Receiving a first information, the first information is used to indicate a first parameter, the first parameter is associated with one of the L spatial parameter sets, and the L spatial parameter sets are respectively in one-to-one correspondence with L time domain resources, where L is a positive integer greater than one;

Transmitting a first wireless signal in a first time domain resource of a first sub-band, the first time domain resource being one of the L time domain resources;

Wherein the first sub-band includes a frequency domain resource occupied by the first wireless signal; wherein the L time domain resources belong to a first time window, and the first information is used to determine the first time domain resource from the L time domain resources; the first parameter is used to determine transmitting antenna port group of the first wireless signal; the antenna port group is composed of a positive integer number of antenna port(s).

In one embodiment, the problem to be solved by the present disclosure is that multiple UEs can share the same unlicensed spectrum resource in order to improve resource utilization. In order to reduce interference between multiple UEs, the base station may allocate different time domain resources or initial transmitting time to different UEs. Under this mechanism, in order to improve the utilization of spectrum resources, which UEs can occupy the same time domain resources or the initial transmitting time is a key problem to be solved.

In one embodiment, the essence of the foregoing method is that the first parameter represents UE beam, the L spatial parameter sets are L beam sets, the different beam sets correspond to different time domain resources or the initial transmitting time, and the UE beam is in which range of the beam set, the uplink wireless signal is transmitted at the time domain resource corresponding to the beam set or the initial transmitting time. Multiple beams in a beam set may have low correlation or long-distance deviation, so that when multiple UEs respectively use multiple beams in one beam set to simultaneously transmit uplink wireless signal, inter-user interference is small, so that the base station can solve the wireless signal of the multiple UEs. If the correlation between two UE beams is large or the direction is adjacent, through the two beams may be respectively corresponding to different time domain resources or initial transmitting times to reduce inter-user interference, thereby ensuring that the base station successfully solves the uplink wireless signal. The advantage of the above method is that the sharing of unlicensed spectrum resources by multiple UEs is effectively implemented, the mutual interference between users is reduced, and the transmission efficiency of the unlicensed spectrum is improved.

According to an aspect of the present disclosure, the above method includes:

Performing the first access detection;

Wherein the first access detection is used to determine the first wireless signal is transmitted in the first time domain resource of the first sub-band, and end time of the first access detection is not later than initial transmitting time of the first wireless signal.

According to an aspect of the present disclosure, the first spatial parameter set is one of the L spatial parameter sets to which the first parameter is associated, and the first time domain resource is one of the L time domain resources corresponding to the first spatial parameter set.

In one embodiment, the method has the following advantages. When the UE beam changes according to the change of the channel environment, if the beam set to which the beam belongs does not change, the UE still transmits the wireless signal on the time domain resource corresponding to the beam set or the initial transmitting time; otherwise, when the beam set to which the UE belongs changes, that is, when the original beam set is hopped to a new beam set, then the UE transmits the wireless signal is not in the time domain resource corresponding to the original beam set or the initial transmitting time, and the UE will transmit the wireless signal at the time domain resource corresponding to the new beam set or the initial transmitting time.

According to an aspect of the present disclosure, the above method includes:

receiving second information;

wherein, the second information is used to indicate the L spatial parameter sets.

According to an aspect of the present disclosure, the above method includes:

receiving third information;

wherein, the third information is used to determine M time windows, the first time window is one of the M time windows, and M is a positive integer greater than one.

According to an aspect of the present disclosure, the third information and time domain location of the first time window are used together to determine the L spatial parameter sets and the L time domain resources are in one-to-one correspondence.

In one embodiment, the essence of the above method is that the first time domain resource for transmitting the first wireless signal varies with the time domain location of the first time window. The advantage of using the above method is that different UEs can occupy different time domain resources or initial transmitting time in different time windows of the M time windows, and avoid the situation that a specific UE always preempts the channel before other UEs.

In one embodiment, the foregoing method has the advantage that the unfairness of other UEs caused by a certain UE occupying the channel preemptively in all time windows in the M time windows is avoided.

In one embodiment, the foregoing method has the advantages that different UEs can be allocated different time domain resources or initial transmitting time in the same time window of the M time windows to avoid interference between UEs, and the time domain resource occupied by one UE or the initial transmitting time changes with time, thereby avoiding the unfairness of channel occupancy between UEs caused by the specific UE always preempting the channel before other UEs.

According to an aspect of the present disclosure, the above method includes:

selecting the first time window from the M time windows.

According to an aspect of the present disclosure, the above method includes:

receiving fourth information;

wherein, the fourth information is used to indicate the frequency domain resource occupied by the first wireless signal.

According to an aspect of the present disclosure, the above method includes:

receiving fifth information;

wherein, the fifth information is used to indicate whether the first wireless signal is correctly received.

The present disclosure discloses a method for wireless communication in a base station equipment, which includes:

transmitting first information, the first information is used to indicate a first parameter, the first parameter is associated with one of L spatial parameter sets, and the L spatial parameter sets are respectively in one-to-one correspondence relationship with L time domain resources, the L is a positive integer greater than one;

monitoring a first wireless signal in a first sub-band, and receiving the first wireless signal in a first time domain resource of the first sub-band, the first time domain resource is one of the L time domain resources;

wherein the first sub-band includes a frequency domain resource occupied by the first wireless signal, the L time domain resources belong to a first time window, and the first information is used to determine the first time domain resource from the L time domain resources, the first parameter is used to determine transmitting antenna port group of the first wireless signal, and the antenna port group is composed of a positive integer number of antenna port(s).

According to an aspect of the present disclosure, transmitter of the first wireless signal performs a first access detection, the first access detection being used to determine the first wireless is transmitted in the first time domain resource of the first sub-band, and end time of the first access detection is not later than initial transmitting time of the first wireless signal.

According to an aspect of the present disclosure, a first spatial parameter set is one of the L spatial parameter sets to which the first parameter is associated, the first time domain resource is one of the L time domain resources corresponding to the first spatial parameter set.

According to an aspect of the present disclosure, the above method includes:

transmitting a second information;

wherein, the second information is used to indicate the L spatial parameter sets.

According to an aspect of the present disclosure, the above method includes:

transmitting a third information;

wherein, the third information is used to determine M time windows, the first time window is one of the M time windows, and M is a positive integer greater than one.

According to an aspect of the present disclosure, the third information and time domain location of the first time window are used together to determine the L spatial parameter sets and the L time domain resources are in one-to-one correspondence.

According to an aspect of the present disclosure, the transmitter of the first wireless signal selects the first time window by itself from the M time windows.

According to an aspect of the present disclosure, the above method includes:

transmitting fourth information;

wherein, the fourth information is used to indicate the frequency domain resource occupied by the first wireless signal.

According to an aspect of the present disclosure, the above method includes:

transmitting fifth information;

wherein, the fifth information is used to indicate whether the first wireless signal is correctly received.

The present disclosure discloses a user equipment for wireless communication, which includes:

a first receiver receiving a first information, wherein the first information is used to indicate a first parameter, and the first parameter is associated with one of L spatial parameter sets, the L spatial parameter sets are respectively in one-to-ne correspondence relationship with L time domain resources, L is a positive integer greater than one;

a first transmitter transmitting a first wireless signal in a first time domain resource of the first sub-band; the first time domain resource is one of the L time domain resources;

wherein the first information is used to determine the first time domain resource from the L time domain resources, the first parameter is used to determine a transmitting antenna port group of the first wireless signal, the antenna port group is composed of a positive integer number of antenna port(s).

In one embodiment of the above user equipment, the first receiver further performs a first access detection; wherein the first access detection is used to determine the first wireless signal is transmitted in the first time domain resource of the first sub-band, and end time of the first access detection is not later than initial transmitting time of the first wireless signal.

In one embodiment, a first spatial parameter set is one of the L spatial parameter sets to which the first parameter is associated, and the first time domain resource is one of the L time domain resources corresponding to the first spatial parameter set.

In one embodiment, the first receiver further receives a second information; wherein the second information is used to indicate the L spatial parameter sets.

In one embodiment, the first receiver further receives a third information; wherein the third information is used to determine M time windows, the first time window is one of the M time windows, M being a positive integer greater than one.

In one embodiment, the third information and time domain location of the first time window are used together to determine the L spatial parameter sets and the L time domain resources are in one-to-one correspondence.

In one embodiment, the first receiver further selects the first time window by itself from the M time windows.

In one embodiment, the first receiver further receives a fourth information, wherein the fourth information is used to indicate the frequency domain resource occupied by the first wireless signal.

In one embodiment, the first receiver further receives a fifth information; wherein the fifth information is used to indicate whether the first wireless signal is correctly received.

The present disclosure discloses a base station equipment for wireless communication, which includes:
a second transmitter transmitting a first information; the first information is used to indicate a first parameter, the first parameter is associated with one of L spatial parameter sets, the L spatial parameter sets are respectively in one-to one correspondence relationship with the L time domain resources, L is a positive integer greater than one;
a second receiver monitoring a first wireless signal in a first sub-band, and receives the first wireless signal in a first time domain resource of the first sub-band; the first time domain resource is one of the L time domain resource;
wherein, the first information is used to determine the first time domain resource from the L time domain resources, the first parameter is used to determine a transmitting antenna port group of the first wireless signal; the antenna port group is composed of a positive integer number of antenna port(s).

In one embodiment, transmitter of the first wireless signal performs a first access detection, and the first access detection is used to determine the first wireless signal is transmitted in the first time domain resource of the first sub-band, and end time of the first access detection is not later than initial transmitting time of the first wireless signal.

In one embodiment, a first spatial parameter set is one of the L spatial parameter sets to which the first parameter is associated, and the first time domain resource is one of the L time domain resources corresponding to the first spatial parameter set.

In one embodiment, the second transmitter further transmits a second information; wherein the second information is used to indicate the L spatial parameter sets.

In one embodiment, the second transmitter further transmits a third information; wherein the third information is used to determine M time windows, the first time window is one of the M time windows, M being a positive integer greater than one.

In one embodiment, the third information and time domain location of the first time window are used together to determine the L spatial parameter sets and the L time domain resources are in one-to-one correspondence.

In one embodiment, the transmitter of the first wireless signal selects the first time window by itself from the M time windows.

In one embodiment, the second transmitter further transmits a fourth information, wherein the fourth information is used to indicate the frequency domain resource occupied by the first wireless signal.

In one embodiment, the second transmitter further transmits a fifth information; wherein the fifth information is used to indicate whether the first wireless signal is correctly received.

In one embodiment, the present disclosure has the following advantages compared with the conventional method:

The different beam sets correspond to different time domain resources or initial transmitting time. In which beam set the UE beam is, the uplink wireless signal is transmitted on the time domain resource corresponding to the beam set or the initial transmitting time. Multiple beams in a beam set may have low correlation or long-distance deviation, so that when multiple UEs use respectively multiple beams in one beam set to simultaneously transmit uplink wireless signal, inter-user interference is small, so that the base station can solve the wireless signal of the multiple UEs. If the correlation between the beams of the two UEs is large or the direction is adjacent, the two beams may be respectively corresponding to different time domain resources or initial transmitting times to reduce inter-user interference, thereby ensuring that the base station successfully solves the uplink wireless signal. The sharing of unlicensed spectrum resources by multiple UEs is effectively implemented, the mutual interference between users is reduced, and the transmission efficiency of the unlicensed spectrum is improved.

With the channel environment changes, when the UE beam changes, if the beam set to which the beam belong remains the same, then the UE still transmits wireless signal on the time-domain resources corresponding to the bean set or on the starting transmitting time; otherwise, When the beam set to which the UE's beam belongs changes, that is, when the original beam set is hopped to a new beam set, then the UE does not transmits wireless signal on the time domain resources corresponding to the original beam set or on the starting transmitting time. The UE will transmit wireless signal on the corresponding time domain resources of the new beam set or on the initial transmitting time.

According to the speed of the beam change, the UE can dynamically select the time domain resource for transmitting the uplink wireless signal or the initial transmitting time.

Different UEs may be allocated different time domain resources or initial transmitting time in the same time window to avoid interference between UEs, and the time domain resources or initial transmitting time occupied by one UE may change with time, thereby avoiding the unfairness of channel occupancy between UEs caused by a specific UE always preempting the channel before other UEs.

BRIEF DESCRIPTION OF THE DRAWINGS

Other features, objects, and advantages of the present disclosure will become more apparent from the detailed description of the accompanying drawings.

DETAILED DESCRIPTION OF THE EMBODIMENTS

The following description with reference to the accompanying drawings is provided to explain the exemplary embodiments of the disclosure. Note that in the case of no conflict, the embodiments of the present disclosure and the features of the embodiments may be arbitrarily combined with each other.

Embodiment I

Figure 1:
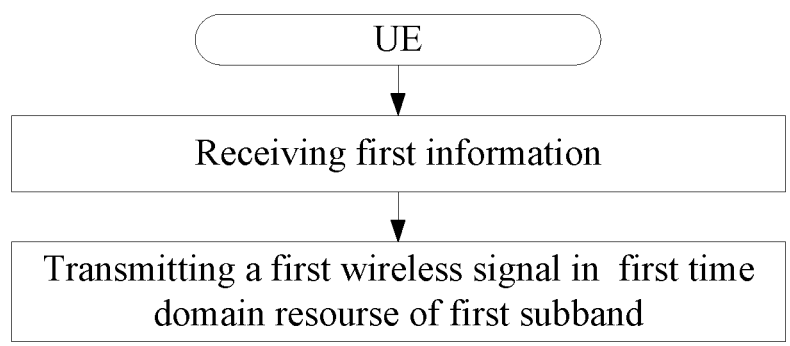
FIG. 1 shows a flowchart of a first information and a first wireless signal according to one embodiment of the present disclosure.

Embodiment I shows a flow chart of a first information and a first wireless signal, as shown in FIG. 1.

In Embodiment I, the user equipment in the present disclosure receives a first information, the first information is used to indicate a first parameter, and the first parameter is associated to one of L spatial parameter sets, the L spatial parameter sets are respectively in one-to-one correspond to L time domain resources, the L is a positive integer greater than on; the first wireless signal is transmitted in the first time domain resource of the first sub-band, the first time domain resource is one of the L time domain resources; wherein the first sub-band includes a frequency domain resource occupied by the first wireless signal, and the L time domain resources all belong to the first time window, the first information is used to determine the first time domain resource from the L time domain resources, and the first parameter is used to determine a transmitting antenna port group of the first wireless signal, the antenna port group being composed of a positive integer number of antenna port(s).

In one embodiment, the first information explicitly indicates the first parameter.

In one embodiment, the first information implicitly indicates the first parameter.

In one embodiment, the first information is dynamically configured.

In one embodiment, the first information is carried by physical layer signaling.

In one embodiment, the first information belongs to DCI (downlink control information).

In one embodiment, the first information belongs to the DCI of the UpLink Grant.

In one embodiment, the first information is a field in a DCI, and the field includes a positive integer number of bits.

In one embodiment, the first information consists of multiple fields in a DCI, and the field includes a positive integer number of bits.

In one embodiment, the first information is transmitted on a frequency band deployed in an unlicensed spectrum.

In one embodiment, the first information is transmitted on a frequency band deployed in the licensed spectrum.

In one embodiment, the first information is transmitted on the first sub-band.

In one embodiment, the first information is transmitted on a frequency band other than the first sub-band.

In one embodiment, the first information is transmitted on a frequency band deployed on the licensed spectrum other than the first sub-band.

In one embodiment, the first information is transmitted on a frequency band deployed on the unlicensed spectrum other than outside the first sub-band.

In one embodiment, the first information is transmitted on a downlink physical layer control channel (i.e., a downlink channel that can only be used to carry physical layer signaling).

In a sub-embodiment of the foregoing embodiment, the downlink physical layer control channel is a PDCCH (Physical Downlink Control CHannel).

In a sub-embodiment of the foregoing embodiment, the downlink physical layer control channel is a sPDCCH (short PDCCH).

In a sub-embodiment of the foregoing embodiment, the downlink physical layer control channel is a NR-PDCCH (New Radio PDCCH).

In a sub-embodiment of the foregoing embodiment, the downlink physical layer control channel is a NB-PDCCH (Narrow Band PDCCH).

In one embodiment, the first information is transmitted on a downlink physical layer data channel (ie, a downlink channel that can be used to carry physical layer data).

In a sub-embodiment of the foregoing embodiment, the downlink physical layer data channel is a PDSCH (Physical Downlink Shared CHannel).

In a sub-embodiment of the foregoing embodiment, the downlink physical layer data channel is a sPDSCH (short PDSCH).

In a sub-embodiment of the foregoing embodiment, the downlink physical layer data channel is a NR-PDSCH (New Radio PDSCH).

In a sub-embodiment of the foregoing embodiment, the downlink physical layer data channel is a NB-PDSCH (Narrow Band PDSCH).

In one embodiment, the first parameter includes at least one of PMI (Precoding Matrix Indicator), CRI (CSI-reference Signal Resource Indicator), SRI (Sounding Reference Signal Resource Indicator), and SSBRI (Synchronization Signal Block Resource Indicator).

In one embodiment, the first parameter includes one of PMI, CRI, SRI, and SSBRI.

In one embodiment, the first parameter includes PMI, and the PMI included in the first parameter is used to indicate a pre-code matrix for uplink transmission.

In one embodiment, the first parameter comprises CRI.

In one embodiment, the first parameter comprises SRI.

In one embodiment, the first parameter comprises SSBRI.

In one embodiment, the spatial parameter included to any two of the spatial parameter sets in the L spatial parameter sets is different from each other.

In one embodiment, a given spatial parameter set is any spatial parameter set in the L spatial parameter sets, and any spatial parameter included in the given spatial parameter set does not belong to any spatial parameter set in the L spatial parameter sets other than the given spatial parameter set.

In one embodiment, any one of the L spatial parameter sets includes a positive integer number of spatial parameters.

In a sub-embodiment of the foregoing embodiment, any one of the positive integer spatial parameters includes one of {PMI, CRI, SRI, SSBRI}.

In a sub-embodiment of the above embodiment, the positive integer spatial parameters all include PMI.

In a sub-embodiment of the above embodiment, the positive integer spatial parameters all include CRI.

In a sub-embodiment of the above embodiment, the positive integer spatial parameters all include SRI.

In a sub-embodiment of the above embodiment, the positive integer spatial parameters all include SSBRI.

In one embodiment, the first sub-band includes a positive integer number of PRBs (Physical Resource Blocks).

In one embodiment, the first sub-band includes a positive integer number of consecutive PRBs.

In one embodiment, the first sub-band includes a positive integer number of RBs (Resource Blocks).

In one embodiment, the first sub-band includes a positive integer number of consecutive RBs.

In one embodiment, the first sub-band includes a positive integer number of consecutive sub-carriers.

In one embodiment, the first sub-band includes a number of consecutive sub-carriers equal to a positive integer multiple of 12.

In one embodiment, the first sub-band is deployed in an unlicensed spectrum.

In one embodiment, the first sub-band includes one carrier.

In one embodiment, the first sub-band includes at least one carrier.

In one embodiment, the first sub-band belongs to one carrier.

In one embodiment, the first sub-band includes a BWP (Bandwidth Part).

In one embodiment, the first sub-band includes multiple BWPs.

In one embodiment, the first sub-band includes one or more BWPs

In one embodiment, the first time window includes a consecutive time periods.

In one embodiment, the first time window includes a positive integer number of consecutive slots.

In one embodiment, the first time window includes a positive integer number of consecutive subframes.

In one embodiment, the first time window includes a positive integer number of consecutive mini-slots.

In one embodiment, the first time window includes a slot.

In one embodiment, the first time window includes a subframe.

In one embodiment, the first time window includes a mini-slot.

In one embodiment, the first time window includes multiple consecutive slots.

In one embodiment, the first time window includes multiple consecutive subframes.

In one embodiment, the first time window includes multiple consecutive mini-slots.

In one embodiment, the first time window is composed of a positive integer number of consecutive multi-carrier symbols.

In one embodiment, the first time window is composed of multiple consecutive multi-carrier symbols.

In one embodiment, the multi-carrier symbol is an OFDM (Orthogonal Frequency-Division Multiplexing) symbol.

In one embodiment, the multi-carrier symbol is a SC-FDMA (Single-Carrier Frequency-Division Multiple Access) symbol.

In one embodiment, the multi-carrier symbol is a FBMC (Filter Bank Multi Carrier) symbol.

In one embodiment, the first wireless signal includes at least one of data, control information, and reference signal.

In one embodiment, the first wireless signal comprises data.

In one embodiment, the first wireless signal includes control information.

In one embodiment, the first wireless signal comprises reference signal.

In one embodiment, the first wireless signal includes data, control information, and reference signal.

In one embodiment, the first wireless signal includes data and control information.

In one embodiment, the first wireless signal includes control information and reference signal.

In one embodiment, the first wireless signal includes data and reference signal.

In one embodiment, the data included in the first wireless signal is uplink data.

In one embodiment, the control information included in the first wireless signal is UCI (Uplink Control Information).

In one embodiment, the control information included in the first wireless signal includes at least one of HARQ (Hybrid Automatic Repeat reQuest) feedback, HARQ process number, NDI (New Data Indicator), the initial transmitting time of the first wireless signal, CSI (Channel State Information), and SR (Scheduling Request).

In a sub-embodiment of the foregoing embodiment, the CSI includes at least one of {RI (Rank indication), PMI (Precoding matrix indicator), CQI (Channel quality indicator), and CRI (Csi-reference signal Resource Indicator)}.

In a sub-embodiment of the foregoing embodiment, the HARQ process number is the number of the HARQ process corresponding to the data included in the first wireless signal.

In a sub-embodiment of the foregoing embodiment, the NDI indicates whether the data included in the first wireless signal is new data or retransmitting of old data.

In one embodiment, the reference signal included in the first wireless signal includes one or more of {DMRS (De-Modulation Reference Signal), SRS (Sounding Reference Signal), and PTRS (Phase Error Tracking Reference Signals)}.

In one embodiment, the reference signal included in the first wireless signal includes SRS.

In one embodiment, the reference signal included in the first wireless signal includes DMRS.

In one embodiment, the reference signal included in the first wireless signal includes PTRS.

In one embodiment, the first wireless signal is transmitted on an uplink random access channel.

In a sub-embodiment of the foregoing embodiment, the uplink random access channel is PRACH (Physical Random Access Channel).

In one embodiment, the transmission channel of the first wireless signal is UL-SCH (Uplink Shared Channel).

In one embodiment, the first wireless signal is transmitted on an uplink physical layer data channel (i.e. an uplink channel that can be used to carry physical layer data).

In a sub-embodiment of the foregoing embodiment, the uplink physical layer data channel is PUSCH (Physical Uplink Shared CHannel).

In a sub-embodiment of the foregoing embodiment, the uplink physical layer data channel is sPUSCH (short PUSCH).

In a sub-embodiment of the foregoing embodiment, the uplink physical layer data channel is NR-PUSCH (New Radio PUSCH).

In a sub-embodiment of the foregoing embodiment, the uplink physical layer data channel is NB-PUSCH (Narrow Band PUSCH).

In one embodiment, the first wireless signal is transmitted on an uplink physical layer control channel (ie, an uplink channel that can only be used to carry physical layer signaling).

In a sub-embodiment of the foregoing embodiment, the uplink physical layer control channel is PUCCH (Physical Uplink Control CHannel).

In a sub-embodiment of the foregoing embodiment, the uplink physical layer control channel is sPUCCH (short PUCCH).

In a sub-embodiment of the foregoing embodiment, the uplink physical layer control channel is NR-PUCCH (New Radio PUCCH).

In a sub-embodiment of the foregoing embodiment, the uplink physical layer control channel is NB-PUCCH (Narrow Band PUCCH).

Embodiment II

Figure 2:
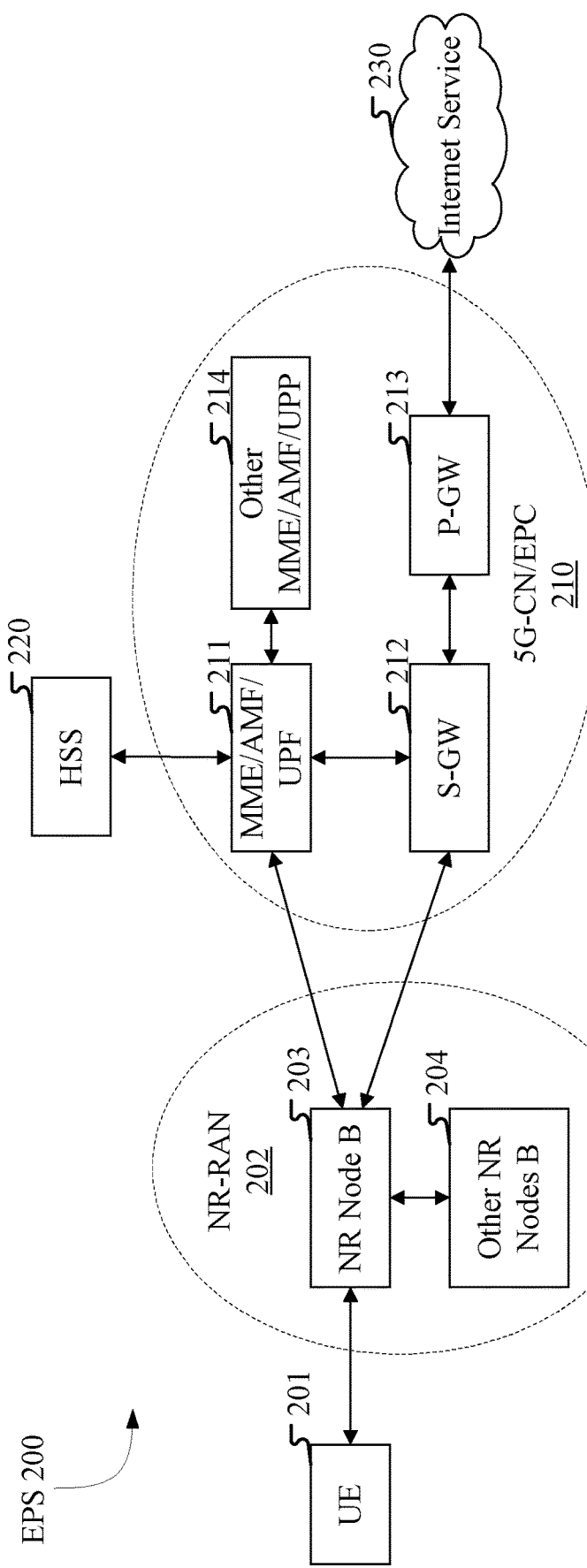
FIG. 2 shows a schematic diagram of network architecture according to one embodiment of the present disclosure.

Embodiment II shows a schematic diagram of network architecture, as shown in FIG. 2.

Embodiment II illustrates a schematic diagram of a network architecture according to the present discloses, as shown in FIG. 2.

FIG. 2 describes a system network structure 200 of NR 5G, LTE (long-term evolution) and LTE-A (long-term evolution advanced). The network architecture 200 of NR 5G or LTE may be referred to as an EPS (evolve packet system) 200 or some other suitable terminology. The EPS 200 may include one or more UEs 201, NG-RAN (radio access network) 202, 5G-CN (core network)/EPC (evolved packet core) 210, HSS (Home Subscriber Server) 220 and the internet service 230. EPS may be interconnected with other access networks, but for the sake of simplicity, these entities/interfaces are not shown. As shown in FIG. 2, the EPS provides the packet switching services. Those skilled in the art would readily appreciate that the various concepts presented throughout this disclosure can be extended to networks or other cellular networks that provide circuit switched services. The NG-RAN comprises an NR Node B (gNB) 203 and other gNBs 204. The gNB 203 provides user and control plane protocol termination for the UE 201. The gNB 203 can be connected to other gNBs 204 via an Xn interface (e.g., a backhaul). The gNB 203 may also be referred to as a base station, a base transceiver station, a wireless base station, a wireless transceiver, a transceiver function, a basic service set (BSS), an extended service set (ESS), a TRP (transmission and reception point), or some other suitable terminology. The gNB 203 provides the UE 201 with an access point to the 5G-CN/EPC 210. In the embodiment, the UE 201 comprises cellular telephones, smart phones, Session Initiation Protocol (SIP) phones, laptop computers, personal digital assistants (PDAs), satellite wirelesses, non-terrestrial base station communications, satellite mobile communications, global positioning systems, multimedia devices, Video devices, digital audio player (e.g. MP3 players), cameras, game consoles, drones, aircrafts, narrowband physical network devices, machine type communication devices, land vehicles, cars, wearable devices, or any other similar to functional devices. A person skilled in the art may also refer to UE 201 as a mobile station, a subscriber station, a mobile unit, a subscriber unit, a wireless unit, a remote unit, a mobile device, a wireless device, a wireless communication device, a remote device, a mobile subscriber station, an access terminal, a mobile terminal, a wireless terminal, remote terminal, handset, user agent, mobile client, client or some other suitable term. The gNB 203 is connected to the 5G-CN/EPC 210 through an S1/NG interface. 5G-CN/EPC 210 comprises MME/AMF/UPF 211, other MME (Mobility Management Entity)/AMF (Authentication Management Field)/UPF (User Plane Function) 214 An S-GW (Service Gateway) 212 and a P-GW (Packet Date Network Gateway) 213. The MME/AMF/UPF 211 is a control node that handles signaling between the UE 201 and the 5G-CN/EPC 210. In general, MME/AMF/UPF 211 provides bearer and connection management. All User IP (Internet Protocol) packets are transmitted through the S-GW 212, and the S-GW 212 itself is connected to the P-GW 213. The P-GW 213 provides UE IP address allocation as well as other functions. The P-GW 213 is connected to the internet service 230. The internet service 230 comprises an operator-compatible internet protocol service, and may specifically include the Internet, an intranet, an IMS (IP Multimedia Subsystem), and a PS Streaming Service (PSS).

In one embodiment, the UE 201 corresponds to the user equipment in this disclosure.

In one embodiment, the gNB 203 corresponds to the base station in this disclosure.

In a sub-embodiment, the UE 201 supports the data transmission in the unlicensed spectrum in a wireless communication.

In a sub-embodiment, the UE 201 supports the data transmission in the licensed spectrum in a wireless communication.

In a sub-embodiment, the gNB 203 supports the data transmission in the unlicensed spectrum in a wireless communication.

In a sub-embodiment, the gNB 203 supports the data transmission in the licensed spectrum in a wireless communication.

In a sub-embodiment, the UE 201 supports wireless communication of massive MIMO.

In a sub-embodiment, the gNB 203 supports wireless communication of massive MIMO.

Embodiment III

Figure 3:
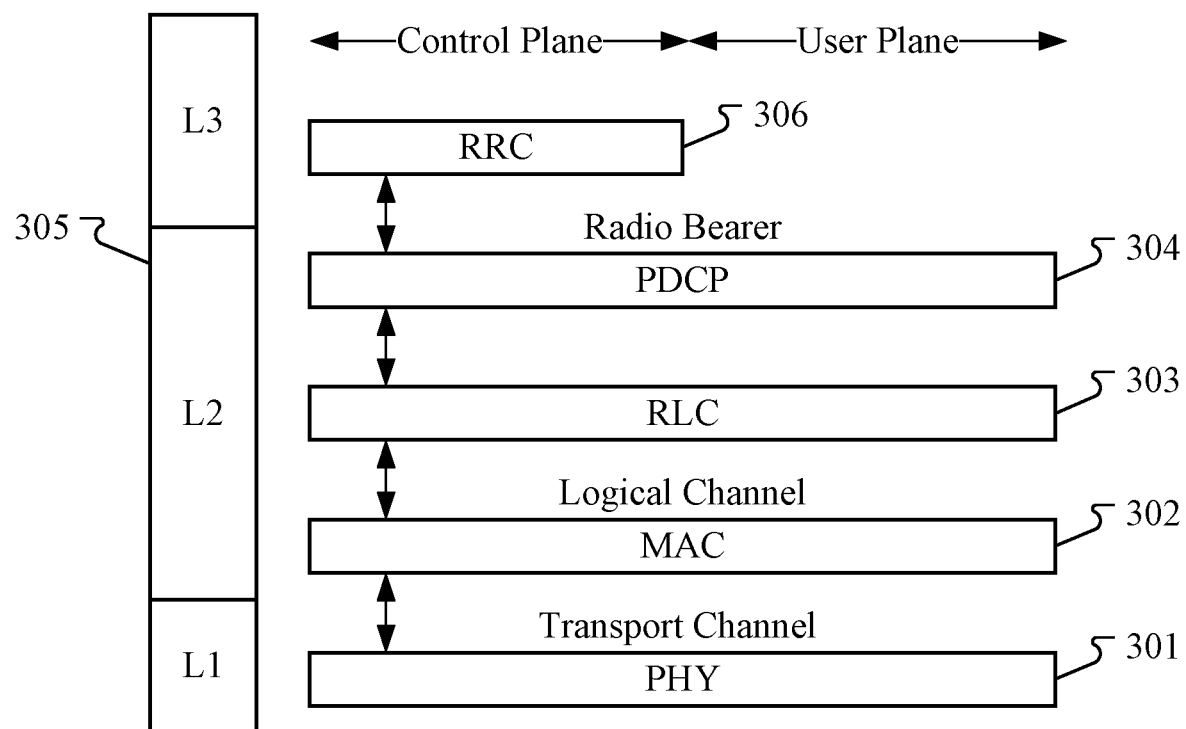
FIG. 3 shows a schematic diagram of protocol architecture of a user plane and a control plane in accordance with one embodiment of the present disclosure.

Embodiment III shows a schematic diagram of wireless protocol architecture of a user plane and a control plane according to the present disclosure, as shown in FIG. 3.

FIG. 3 is a schematic diagram illustrating an embodiment of a wireless protocol architecture for a user plane and a control plane, and FIG. 3 shows a wireless protocol architecture for the user equipment (UE) and the base station equipment (gNB or eNB) in three layers: layer 1, layer 2 and layer 3. Layer 1 (L1 layer) is the lowest layer and implements various physical layer (PHY) signal processing functions, and layers above layer 1 belong to higher layers. The L1 layer will be referred to herein as PHY 301. Layer 2 (L2 layer) 305 is above PHY 301 and is responsible for the link between the UE and the gNB through PHY 301. In the user plane, L2 layer 305 comprises a media access control (MAC) sub-layer 302, a radio link control (RLC) sub-layer 303 and a packet data convergence protocol (PDCP) sub-layer 304, and these sub-layers terminate at the gNB on the network side. Although not illustrated, the UE may have several upper layers above the L2 layer 305, further comprising a network layer (e.g. an IP layer) terminated at the P-GW on the network side and terminated at the other end of the connection (e.g. Application layer at the remote UE, server, etc.). The PDCP sub-layer 304 provides multiplexing between different wireless bearers and logical channels. The PDCP sublayer 304 also provides header compression for upper layer data packets to reduce wireless transmission overhead, and provides the security by encrypting data packets, and provides handoff support for UEs between gNBs. The RLC sublayer 303 provides segmentation and reassembly of upper layer data packets, retransmission of lost packets and the reordering of data packets to compensate for the disordered reception resulted by the hybrid automatic repeat request (HARQ). The MAC sublayer 302 provides multiplexing between the logical and transport channels. The MAC sublayer 302 is also responsible for allocating various wireless resources (e.g. resource blocks) in one cell between UEs. The MAC sublayer 302 is also responsible for HARQ operations. In the control plane, the wireless protocol architecture for the UE and gNB is substantially the same for the physical layer 301 and the L2 layer 305, but there is no header compression function for the control plane. The control plane also comprises an RRC (Wireless Resource Control) sublayer 306 in Layer 3 (L3 layer). The RRC sublayer 306 is responsible for obtaining wireless resources (i.e. wireless bearers) and configuring the lower layer using RRC signaling between the gNB and the UE.

In one embodiment, the wireless protocol architecture of FIG. 3 is applicable to the user equipment in this disclosure.

In one embodiment, the wireless protocol architecture of FIG. 3 is applicable to the base station in this disclosure.

In one embodiment, the first information in the present disclosure is generated by the PHY 301.

In one embodiment, the first wireless signal in the present disclosure is generated by the PHY 301.

In one embodiment, the first access detection in the present disclosure is generated by the PHY 301.

In one embodiment, the second information in the present disclosure is generated by the RRC sublayer 306.

In one embodiment, the second information in the present disclosure is generated by the MAC sublayer 302.

In one embodiment, the third information in the present disclosure is generated by the RRC sublayer 306.

In one embodiment, the third information in the present disclosure is generated by the MAC sublayer 302.

In one embodiment, the fourth information in the present disclosure is generated by the PHY 301.

In one embodiment, the fifth information in the present disclosure is generated by the PHY 301.

Embodiment IV

Figure 4:
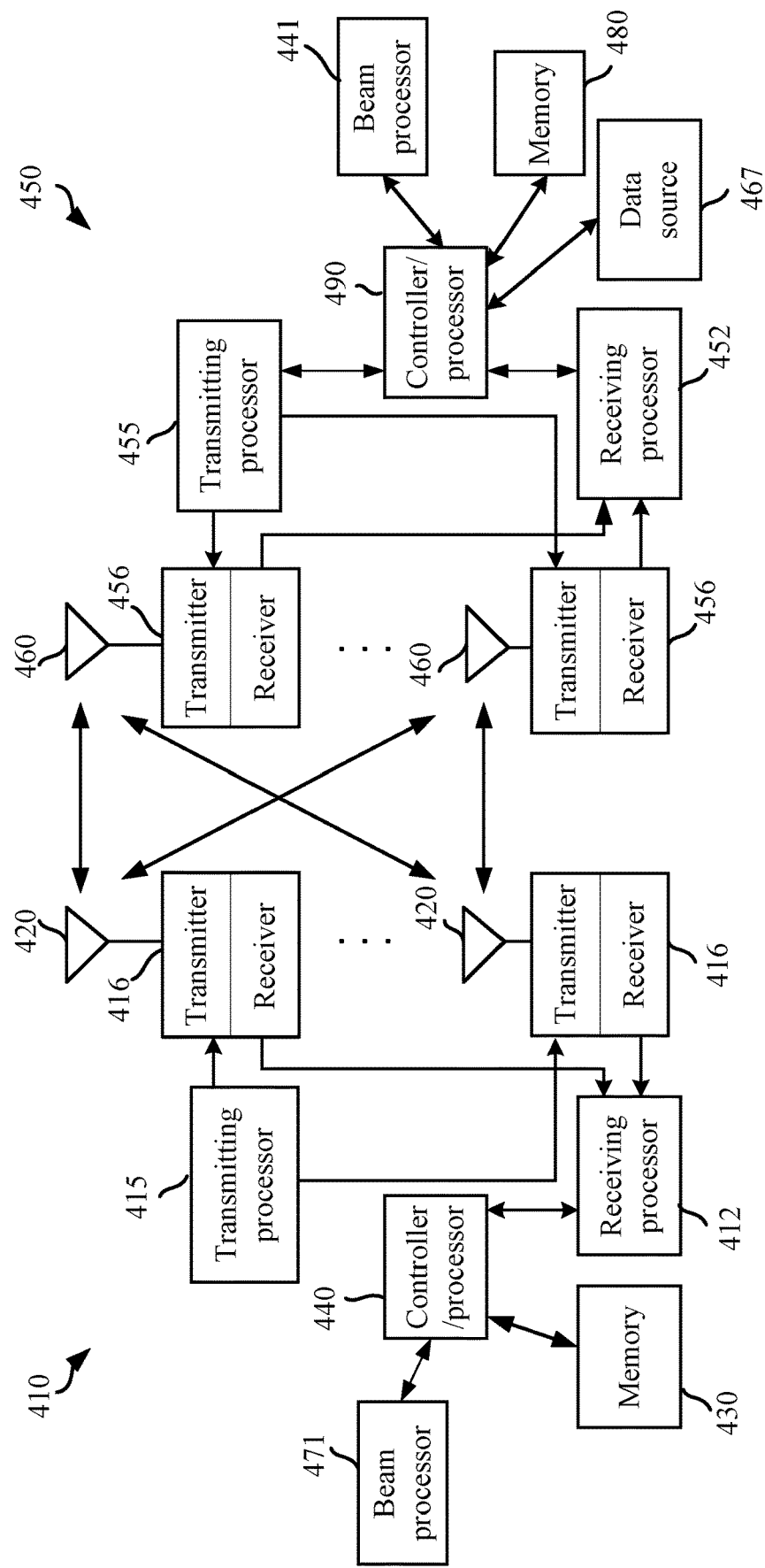
FIG. 4 shows a schematic diagram of an NR (New Radio) node and a UE in accordance with one embodiment of the present disclosure.

Embodiment IV shows a schematic diagram of base station equipment and user equipment according to the present disclosure, as shown in FIG. 4. FIG. 4 is a block diagram of a gNB 410 in communication with a UE 450 in an access network.

The base station equipment 410 comprises a controller/processor 440, a memory 430, a receiving processor 412, a beam processor 471, a transmitting processor 415, the transmitter/receiver 416 and the antenna 420.

The user equipment 450 comprises a controller/processor 490, a memory 480, a data source 467, a beam processor 441, a transmitting processor 455, a receiving processor 452, a transmitter/receiver 456, and an antenna 460.

In the downlink transmission (DL), the processing related to the base station equipment (410) comprises:

a controller/processor 440, which provides header compression, encryption, packet segmentation and reordering, and multiplexing and demultiplexing between logical and transport channels when upper layer packet arrives, for implanting L2 layer protocol of the user plane and the control plane, the upper layer packet may include data or control information, such as downlink shared channel (DL-SCH);

the controller/processor 440, which is associated with a memory 430 that stores program codes and data, the memory 430 may be a computer-readable medium;

the controller/processor 440, which comprises the scheduling unit for transmitting a demand, the scheduling unit is configured for scheduling the air interface resource(s) corresponding to the transmission requirements;

a beam processor 471, which determines a first information;

the transmitting processor 415, which receives the output bit stream of the controller/processor 440, and implements for the L1 layer (i.e. physical layer) of the various signal transmission processing functions comprising coding, interleaving, scrambling, modulation, power control/allocation and physical layer control signaling (comprising PBCH, PDCCH, PHICH, PCFICH, reference signal) generation, etc.;

the transmitting processor 415, which receives the output bit stream of the controller/processor 440, and implements for the L1 layer (i.e. physical layer) of the various signal transmission processing functions comprising multi-antenna transmission, spread spectrum, code division multiplexing, precoding, etc.;

the transmitter 416, which is configured for converting the baseband signals provided by the transmit processor 415 into radio frequency signals and transmitting the signals via the antenna 420; each transmitter 416 samples the respective input symbol stream to obtain respective sampled signal streams. Each transmitter 416 further process the respective sample streams (e.g. digital to analog conversion, amplification, filtering, upconversion, etc.) to obtain a downlink signal.

In the DL transmission, the processing related to the user equipment (450) may include:

a receiver 456, which is configured for converting the radio frequency signal received to a baseband signal through the antenna 460, and the based signal is provided to the receiving processor 452;

a receiving processor 452, which implements for the L1 layer (i.e. physical layer) of the various signal receiving processing functions further comprising decoding, deinterleaving, descrambling, demodulation and physical layer control signaling extraction, etc.;

a receiving processor 452, which implements for the L1 layer (i.e. physical layer) of the various signal receiving processing functions further comprising multi-antenna reception, dispreading, code division multiplexing, pre-coding, etc.;

a beam processor 441, which determines a first information;

a controller/processor 490, which receives the bit stream output by the receive processor 452, provides header decompression, decryption, packet segmentation and reordering, and multiplexing and demultiplexing between the logical and transport channels to implement L2 layer protocol for user plane and control plane;

the controller/processor 490, which is associated with a memory 480 that stores program codes and data, and the memory 480 may be a computer-readable medium.

In uplink (UL), the processing related to the base station equipment (410) comprises:

a receiver 416, which receives a radio frequency signal through its respective antenna 420, converts the received RF signal into a baseband signal and provides the baseband signal to the receiving processor 412;

a receiving processor 412, which implements for the L1 layer (i.e. physical layer) of the various signal receiving processing functions comprising decoding, deinterleaving, descrambling, demodulation and physical layer control signaling extraction, etc.;

a receiving processor 412, which implements for the L1 layer (i.e. physical layer) of the various signal receiving processing functions further comprising multi-antenna reception, dispreading, code division multiplexing, pre-coding, etc.;

a controller/processor 440, which implements L2 layer functions and is associated with a memory 430 that stores program codes and data;

the controller/processor 440, which provides demultiplexing, packet reassembly, deciphering, header decompression, control signal processing between logical channels and transports to recover the upper layer packet from UE 450; upper layer packets from controller/processor 440 can be provided to the core network;

a beam processor 471, which determines to receive a first wireless signal in a first time domain resource of a first sub-band;

In uplink (UL), the processing related to the user equipment 450 comprises:

a data source 467, that provides the upper layer packet to a controller/processor 490. The data source 467 represents all protocol layers above the L2 layer;

a transmitter 456, which transmits radio frequency signals by its corresponding antenna 460, converts a baseband signal to the radio frequency (RF) signal, and provides the RF signal to the corresponding antenna 460;

a transmit processor 455, which implements for the L1 layer (i.e. physical layer) of the various signal reception processing functions comprising coding, interleaving, scrambling, multiplexing, modulation, and physical layer signaling generation, etc.;

a transmit processor 455, which implements for the L1 layer (i.e. physical layer) of the various signal reception processing functions further comprising multi-antenna transmission, spreading, code division multiplexing, precoding, etc.;

a controller/processor 490, which implements header compression, encryption, packet segmentation and reordering, and multiplexing between logical and transport channels based on wireless resource allocation of the gNB 410, and implements L2 layer functions for the user plane and the control plane.

the controller/processor 490 is also responsible for HARQ operations, retransmission of lost packets, and the signaling to the gNB 410;

the beam processor 441, which determines to transmit a first wireless signal in a first time domain resource of a first sub-band;

In one embodiment, the UE 450 comprises: at least one processor and at least one memory, the at least one memory further comprising computer program codes; the at least one memory and the computer program code are configured to operate with the processor together, The UE 450 at least: receives a first information, the first information being used to indicate a first parameter, the first parameter being associated to one of L spatial parameter sets, the L spatial parameter sets are respectively in one-to-one correspondence with L time domain resources, L is a positive integer greater than one; a first wireless signal is transmitted in a first time domain resource of a first sub-band, the first time domain resource is one of the L time domain resources; wherein the first sub-band includes a frequency domain resource occupied by the first wireless signal, and the L time domain resources belong to a first time window, the first information is used to determine the first time domain resource from the L time domain resources, and the first parameter is used to determine a transmitting antenna port group of the first wireless signal, the antenna port group consisting of a positive integer of antennas port(s).

In one embodiment, the UE 450 comprises a memory storing a computer readable instruction program, which generates an action when executed by at least one processor, and the action comprises: receiving a first information which used to indicate a first parameter, the first parameter is associated with one of L spatial parameter sets, and the L spatial parameter sets are respectively in one-to-one correspondence with L time domain resources, L is a positive integer greater than one; a first wireless signal is transmitted in a first time domain resource of a first sub-band, and the first time domain resource is one of the L time domain resources; wherein the first sub-band includes a frequency domain resource occupied by the first wireless signal, the L time-domain resources all belong to a first time window, and the first information is used to determining the first time domain resource from the L time-domain resource, the first parameter is used to determine a transmitting antenna port group of the first wireless signal, and the antenna port group is composed of a positive integer number of antenna port(s).

In one embodiment, the gNB 410 device comprises: at least one processor and at least one memory, the at least one memory comprises computer program codes; the at least one memory and the computer program code are configured to be operated with at least one processor together. The gNB 410 device at least: transmitting a first information, the first information is used to indicate a first parameter, and the first parameter is associated to one of L spatial parameter sets, the L spatial parameter sets are respectively in one-to-one correspondence with L time domain resources, L is a positive integer greater than one; monitoring a first wireless signal in a first sub-band, and receiving the first wireless signal in a first time domain resource of the first sub-band, the first time domain resource is one of the L time domain resources; wherein the first sub-band includes a frequency domain resource occupied by the first wireless signal, the L time domain resources all belong to a first time window, and the first information is used to determine the first time domain resource from the L time domain resources, the first parameter is used to determine a transmitting antenna port group of the first wireless signal, the antenna port group is composed of a positive integer number of antenna port(s).

In one sub-embodiment, the gNB 410 comprises: a memory storing a computer readable instruction program, which generates an action when executed by at least one processor, and the action comprises: transmitting a first information which is used to indicate a first parameter, the first parameter is associated with one of L spatial parameter sets, and the L spatial parameter sets are respectively in one-to-one correspondence with L time domain resources, L is a positive integer greater than one; monitoring a first wireless signal in a first sub-band, and receiving the first wireless signal in a first time domain resource of the first sub-band, the first time domain resource is one of the L time domain resources; wherein the first sub-band includes a frequency domain resource occupied by the first wireless signal, the L time domain resources all belong to a first time window, and the first information is used to determine the first time domain resource from the L time domain resources, the first parameter is used to determine a transmitting antenna port group of the first wireless signal, the antenna port group is composed of a positive integer number of antenna port(s).

In one embodiment, the UE 450 corresponds to the user equipment in this disclosure.

In one embodiment, gNB 410 corresponds to the base station in this disclosure.

In one embodiment, at least first two of receiver 456, the receiving processor 452, and the controller/processor 490 are configured to receive the first information in this disclosure.

In one embodiment, at least first two of transmitter 416, the transmitting processor 415, and the controller/processor 440 are configured to transmit the first information in this disclosure.

In one embodiment, at least first two of the receiver 456, the receiving processor 452, and the controller/processor 490 are configured to receive the second information in this disclosure.

In one embodiment, at least first two of the transmitter 416, the transmitting processor 415, and the controller/processor 440 are configured to transmit the second information in this disclosure.

In one embodiment, at least first two of the receiver 456, the receiving processor 452, and the controller/processor 490 are configured to receive the third information in this disclosure.

In one embodiment, at least first two of the transmitter 416, the transmitting processor 415, and the controller/processor 440 are configured to transmit the third information in this disclosure.

In one embodiment, at least first two of receiver 456, the receiving processor 452, and the controller/processor 490 are configured to receive the fourth information in this disclosure.

In one embodiment, at least first two of the transmitter 416, the transmitting processor 415, and the controller/processor 440 are configured to transmit the fourth information in this disclosure.

In one embodiment, at least first two of receiver 456, the receiving processor 452, and the controller/processor 490 are configured to receive the fifth information in this disclosure.

In one embodiment, at least first two of the transmitter 416, the transmitting processor 415, and the controller/processor 440 are configured to transmit the fifth information in this disclosure.

In one embodiment, at least first two of the transmitter 456, the transmit processor 455, and the controller/processor 490 are used to transmit the first wireless signal in this disclosure in the first time domain resource of the first sub-band in this disclosure.

In one embodiment, at least first two of receiver 416, the receiving processor 412, and the controller/processor 440 are configured to receive the first wireless signal in this disclosure in the first time domain resource of the first sub-band in this disclosure.

In one embodiment, at least first two of receiver 456, the receiving processor 452, and the controller/processor 490 are configured to perform the first access detection in this disclosure.

In one embodiment, at least first two of receiver 456, the receiving processor 452, and the controller/processor 490 are configured to select the first time window from the M time windows in this disclosure.

In one embodiment, at least first two of receiver 416, the receiving processor 412, and the controller/processor 440 are configured to monitor the first wireless signal in this disclosure in the first sub-band in this disclosure.

Embodiment V

Figure 5:
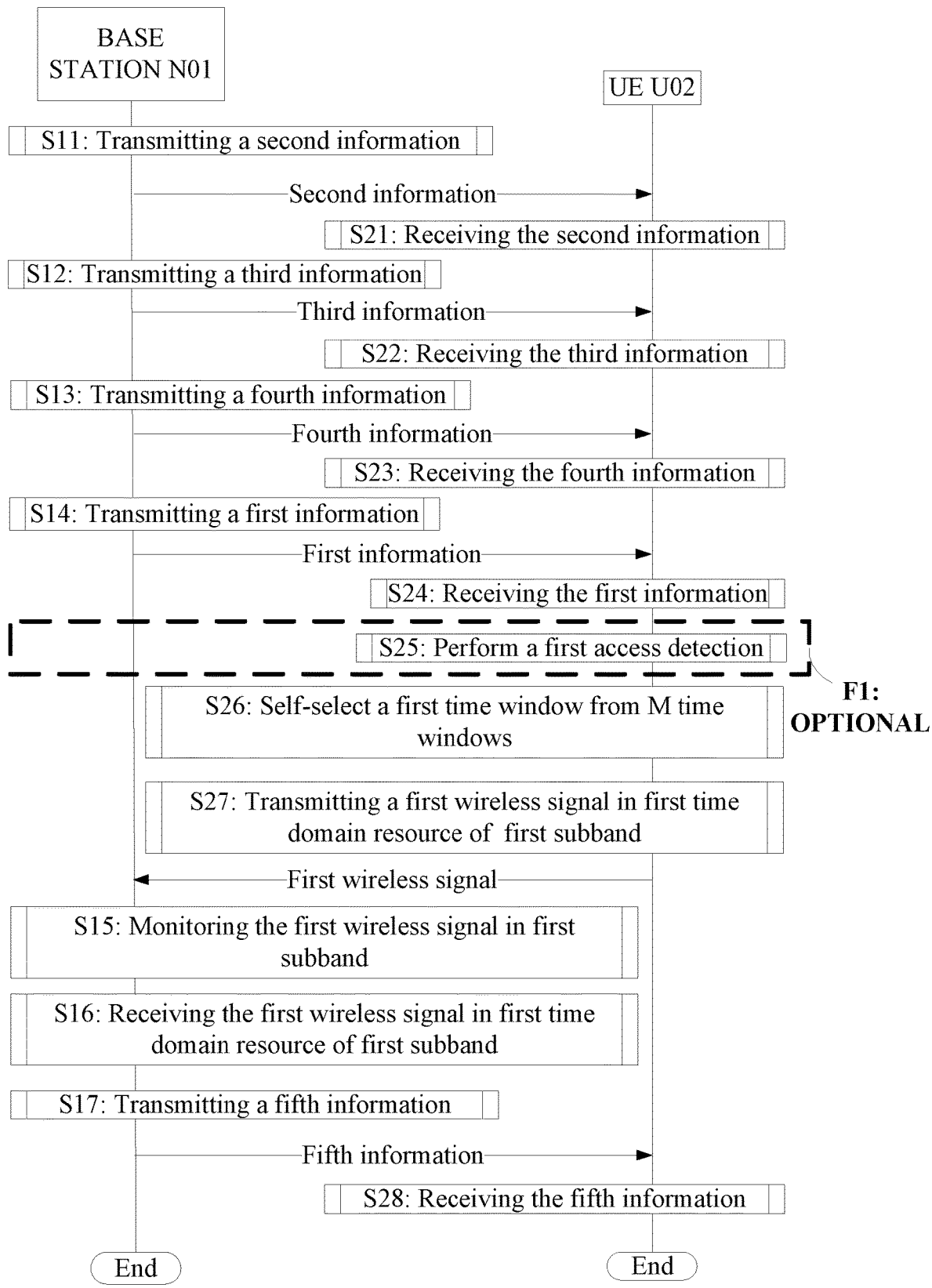
FIG. 5 shows a flow chart of wireless transmission in accordance with one embodiment of the present disclosure.

Embodiment V illustrates a flow chart of wireless transmission, as shown in FIG. 5. In FIG. 5, the base station N01 is a maintenance base station of the serving cell of the user equipment U02, In the figure, the steps in the box identified as F1 are optional.

For the base station N01, in step S11, transmitting a second information; in step S12, transmitting a third information; in step S13, transmitting a fourth information; in step S14, transmitting a first information; in step S15, monitoring a first wireless signal in a first sub-band; in step S16, receiving a first wireless signal in a first time domain resource of a first sub-band; in step S17, transmitting a fifth information.

For the user equipment U02, in step S21, receiving a second information; in step S22, receiving a third information; in step S23, receiving a fourth information; in step S24, receiving a first information; in step S25, performing a first access detection; in step S26, self-selecting a first time window from M time windows; in step S27, transmitting a first wireless signal in a first time domain resource of a first sub-band; in step S28, receiving a fifth information.

In Embodiment V, the first information is used to indicate a first parameter, the first parameter is associated with one of L spatial parameter sets, and the L spatial parameter sets are respectively in one-to-one correspondence with L time domain resources, L is a positive integer greater than one; The first time domain resource is one of the L time domain resources; the first sub-band includes a frequency domain resource occupied by the first wireless signal, the L time domain resources all belong to a first time window, and the first information is used by the U02 to determine the first time domain from the L time domain resources, and the first parameter is used by the U02 to determine a transmitting antenna port group of the first wireless signal, the antenna port group is composed of a positive integer number of antenna port(s). The first access detection is used by the U02 to determine that the first wireless signal is transmitted in the first time domain resource of the first sub-band, and end time of the first access detection is not later than initial transmitting time of the first wireless signal. The second information is used to indicate the L spatial parameter sets. The third information is used by the U02 to determine M time windows, the first time window is one of the M time windows, and M is a positive integer greater than one. The fourth information is used to indicate the frequency domain resource occupied by the first wireless signal. The fifth information is used to indicate whether the first wireless signal is correctly received.

In one embodiment, the first access detection is used by the U02 to determine whether the first sub-band is idle (Idle).

In one embodiment, the first access detection is used by the U02 to determine whether to transmit a wireless signal on the first sub-band.

In one embodiment, the first access detection includes that in Q time sub-pools of the first sub-band respectively perform Q energy detections to obtain Q detection values, Q is a positive integer; end time of the Q time sub-pool is not later than initial transmitting time of the first wireless signal; the Q1 detection values of the Q detection values are lower than a first threshold, and the Q1 is a positive integer not greater than the Q.

In one embodiment, the first information and the second information are used together to determine the first time domain resource from the L time domain resources.

In one embodiment, the second information explicitly indicates the L spatial parameter sets.

In one embodiment, the second information implicitly indicates the L spatial parameter sets.

In one embodiment, the second information is semi-statically configured.

In one embodiment, the second information is carried by higher layer signaling.

In one embodiment, the second information is carried by RRC signaling.

In one embodiment, the second information includes all or a part of an IE (Information Element) in one RRC signaling.

In one embodiment, the second information includes a part of an IE in one RRC signaling.

In one embodiment, the second information includes one or more IEs in one RRC signaling.

In one embodiment, the second information includes multiple IEs in one RRC signaling.

In one embodiment, the second information is carried by MAC CE signaling.

In one embodiment, the second information is carried by broadcast signaling.

In one embodiment, the second information is system information.

In one embodiment, the second information is transmitted in the SIB.

In one embodiment, the second information is transmitted on a frequency band deployed in the unlicensed spectrum.

In one embodiment, the second information is transmitted on a frequency band deployed in the licensed spectrum.

In one embodiment, the second information is transmitted on the first sub-band.

In one embodiment, the second information is transmitted on a frequency band outside the first sub-band.

In one embodiment, the second information is transmitted on a frequency band deployed outside the first sub-band in the licensed spectrum.

In one embodiment, the second information is transmitted on a frequency band deployed outside the first sub-band in the unlicensed spectrum.

In one embodiment, the second information is transmitted on a downlink physical layer data channel (i.e. a downlink channel that can be used to carry physical layer data).

In a sub-embodiment of the foregoing embodiment, the downlink physical layer data channel is PDSCH.

In a sub-embodiment of the foregoing embodiment, the downlink physical layer data channel is sPDSCH.

In a sub-embodiment of the foregoing embodiment, the downlink physical layer data channel is NR-PDSCH.

In a sub-embodiment of the foregoing embodiment, the downlink physical layer data channel is NB-PDSCH.

In one embodiment, the second information is further used to indicate the L spatial parameter sets are respectively in one-to-one correspondence relationship with the L time domain resources.

In a sub-embodiment of the foregoing embodiment, the second information further explicitly indicates the L spatial parameter sets are respectively in one-to-one correspondence relationship with the L time domain resources.

In a sub-embodiment of the foregoing embodiment, the second information further implicitly indicates the L spatial parameter sets are respectively in one-to-one correspondence relationship with the L time domain resources.

In one embodiment, the second information and the third information all belong to the same IE in one RRC signaling.

In one embodiment, the second information and the third information respectively belong to different IEs in one RRC signaling.

In one embodiment, the third information is used to indicate the M time windows.

In one embodiment, the third information explicitly indicates the M time windows.

In one embodiment, the third information implicitly indicates the M time windows.

In one embodiment, the third information is semi-statically configured.

In one embodiment, the third information is carried by higher layer signaling.

In one embodiment, the third information is carried by RRC signaling.

In one embodiment, the third information includes all or a part of an IE in one RRC signaling.

In one embodiment, the third information includes a part of an IE in one RRC signaling.

In one embodiment, the third information includes one or more IEs in one RRC signaling.

In one embodiment, the third information includes multiple IEs in one RRC signaling.

In one embodiment, the third information is used to indicate a time domain resource that can be occupied by the user equipment for SPS.

In a sub-embodiment of the foregoing embodiment, the M time windows are time domain resources that can be occupied by the user equipment for SPS.

In a sub-embodiment of the foregoing embodiment, the user equipment may transmit a wireless signal within the M time windows.

In one embodiment, the third information includes some or all of the fields in the SPS-Config IE.

In one embodiment, the third information is SPS-Config IE.

In one embodiment, the third information is carried by MAC CE signaling.

In one embodiment, the third information is carried by broadcast signaling.

In one embodiment, the third information is system information.

In one embodiment, the third information is transmitted in the SIB.

In one embodiment, the third information is transmitted on a frequency band deployed in the unlicensed spectrum.

In one embodiment, the third information is transmitted on a frequency band deployed in the licensed spectrum.

In one embodiment, the third information is transmitted on the first sub-band.

In one embodiment, the third information is transmitted on a frequency band outside the first sub-band.

In one embodiment, the third information is transmitted on a frequency band deployed outside the first sub-band in the licensed spectrum.

In one embodiment, the third information is transmitted on a frequency band deployed outside the first sub-band in the unlicensed spectrum.

In one embodiment, the third information is transmitted on a downlink physical layer data channel (i.e., a downlink channel that can be used to carry physical layer data).

In a sub-embodiment of the foregoing embodiment, the downlink physical layer data channel is PDSCH.

In a sub-embodiment of the foregoing embodiment, the downlink physical layer data channel is sPDSCH.

In a sub-embodiment of the foregoing embodiment, the downlink physical layer data channel is NR-PDSCH.

In a sub-embodiment of the foregoing embodiment, the downlink physical layer data channel is NB-PDSCH.

In one embodiment, the third information includes a first bit string, and the first bit string includes a positive integer number of bits. The first bit string indicates the M time windows.

In a sub-embodiment of the foregoing embodiment, the first bit string includes 40 bits.

In a sub-embodiment of the foregoing embodiment, the M time windows are a subset of N time windows, and the N is a positive integer not less than the M. The first bit string includes N bits, and the N bits included in the first bit string are in one-to-one correspondence relationship with the N time windows. For any given bit in the first bit string, if the any given bit is equal to one, the one of the N time windows corresponding to the any given bit is one of the M time windows; if the any given bit is equal to 0, the one of the N time windows corresponding to the any given bit is not one of the M time windows.

In an embodiment, the first information and the fourth information are respectively a first field and a second field in the same DCI.

In one embodiment, the first information and the fourth information belong to different DCIs, respectively.

In one embodiment, the fourth information explicitly indicates a frequency domain resource occupied by the first wireless signal.

In one embodiment, the fourth information implicitly indicates a frequency domain resource occupied by the first wireless signal.

In one embodiment, the fourth information includes part or all of information of an RB (Resource Block) assignment field. For specific definition of the RB assignment field, refer to chapter 5.3 in 3GPP TS36.212.

In one embodiment, the fourth information is an RB (Resource Block) assignment field, and the specific definition of the RB assignment field, refer to chapter 5.3 in 3GPP TS36.212.

In one embodiment, the fourth information is dynamically configured.

In one embodiment, the fourth information is carried by physical layer signaling.

In one embodiment, the fourth information belongs to DCI.

In one embodiment, the fourth information belongs to an uplink granted DCI.

In one embodiment, the fourth information is a field in a DCI, and the field includes a positive integer number of bits.

In one embodiment, the fourth information consists of multiple fields in a DCI, the fields comprising a positive integer number of bits.

In one embodiment, the fourth information is transmitted on a frequency band deployed in an unlicensed spectrum.

In one embodiment, the fourth information is transmitted on a frequency band deployed in the licensed spectrum.

In one embodiment, the fourth information is transmitted on the first sub-band.

In one embodiment, the fourth information is transmitted on a frequency band other than the first sub-band.

In one embodiment, the fourth information is transmitted on a frequency band deployed outside the first sub-band in the licensed spectrum.

In one embodiment, the fourth information is transmitted on a frequency band deployed outside the first sub-band in the unlicensed spectrum.

In one embodiment, the fourth information is transmitted on a downlink physical layer control channel (i.e., a downlink channel that can only be used to carry physical layer signaling).

In a sub-embodiment of the foregoing embodiment, the downlink physical layer control channel is PDCCH.

In a sub-embodiment of the foregoing embodiment, the downlink physical layer control channel is sPDCCH).

In a sub-embodiment of the foregoing embodiment, the downlink physical layer control channel is NR-PDCCH.

In a sub-embodiment of the foregoing embodiment, the downlink physical layer control channel is NB-PDCCH.

In one embodiment, the fourth information is transmitted on a downlink physical layer data channel (ie, a downlink channel that can be used to carry physical layer data).

In a sub-embodiment of the foregoing embodiment, the downlink physical layer data channel is PDSCH.

In a sub-embodiment of the foregoing embodiment, the downlink physical layer data channel is sPDSCH.

In a sub-embodiment of the foregoing embodiment, the downlink physical layer data channel is NR-PDSCH.

In a sub-embodiment of the foregoing embodiment, the downlink physical layer data channel is NB-PDSCH.

In one embodiment, the DCI signaling carrying the fourth information is UE specific.

In one embodiment, the signaling identifier of the DCI signaling that carries the fourth information is SPS (Semi-Persistent Scheduling)-C (Cell, Cell)-RNTI (Radio Network Temporary Identifier).

In one embodiment, the fourth information is carried by DCI signaling identified by the SPS-C-RNTI.

In one embodiment, the SPS-C-RNTI is used to generate an RS (Reference Signal) sequence of a DMRS (DeModulation Reference Signal) corresponding to the DCI signaling carrying the fourth information.

In one embodiment, the CRC bit sequence of the DCI signaling carrying the fourth information is scrambled by the SPS-C-RNTI.

In one embodiment, the load size of the DCI signaling carrying the fourth information is equal to the load size of DCI Format 0A (DCI format 0A) or the load size of DCI Format 4A (DCI format 4A).

In a sub-embodiment of the above embodiment, the specific definitions of DCI Format 0A and DCI Format 4A refer to chapter 5.3 of 3GPP TS 36.212.

In one embodiment, DCI signaling carrying the fourth information is used to activate AUL.

In one embodiment, DCI signaling carrying the fourth information is used to activate the M time windows in the present disclosure.

In one embodiment, the DCI signaling that carries the fourth information includes a frequency domain resource occupied by the first wireless signal, and an MCS (Modulation and Coding Scheme) of the first wireless signal, a transmitting antenna port group of the first wireless signal, the cyclic shift and the OCC (Orthogonal Cover Code) of the DMRS of the physical layer channel where the first wireless signal is on.

In one embodiment, the DCI signaling that carries the fourth information includes the first parameter, the frequency domain resource occupied by the first wireless signal, an MCS of the first wireless signal, and a transmitting antenna port group of the first wireless signal, the cyclic shift and the OCC of the DMRS of the physical layer channel where the first wireless signal is on.

In one embodiment, the first information and the fifth information are respectively a third field and a fourth field in the same DCI Format.

In one embodiment, the first information and the fifth information belong to different DCIs, respectively.

In one embodiment, the fourth information and the fifth information belong to different DCIs, respectively.

In one embodiment, the fifth information explicitly indicates whether the first wireless signal is correctly received.

In one embodiment, the fifth information implicitly indicates whether the first wireless signal is correctly received.

In one embodiment, the fifth information is dynamically configured.

In one embodiment, the fifth information is carried by physical layer signaling.

In one embodiment, the fifth information belongs to the DCI.

In one embodiment, the fifth information belongs to the uplink granted DCI.

In one embodiment, the fifth information is a field in a DCI, and the field includes a positive integer number of bits.

In one embodiment, the fifth information consists of multiple fields in a DCI, the fields comprising a positive integer number of bits.

In one embodiment, the fifth information is transmitted on a frequency band deployed in the unlicensed spectrum.

In one embodiment, the fifth information is transmitted on a frequency band deployed in the licensed spectrum.

In one embodiment, the fifth information is transmitted on the first sub-band.

In one embodiment, the fifth information is transmitted on a frequency band other than the first sub-band.

In one embodiment, the fifth information is transmitted on a frequency band deployed outside the first sub-band in the licensed spectrum.

In one embodiment, the fifth information is transmitted on a frequency band deployed outside the first sub-band in the unlicensed spectrum.

In one embodiment, the fifth information is transmitted on a downlink physical layer control channel (i.e. a downlink channel that can only be used to carry physical layer signaling).

In a sub-embodiment of the foregoing embodiment, the downlink physical layer control channel is PDCCH.

In a sub-embodiment of the foregoing embodiment, the downlink physical layer control channel is sPDCCH).

In a sub-embodiment of the foregoing embodiment, the downlink physical layer control channel is NR-PDCCH.

In a sub-embodiment of the foregoing embodiment, the downlink physical layer control channel is NB-PDCCH.

In one embodiment, the fifth information is transmitted on a downlink physical layer data channel (i.e. a downlink channel that can be used to carry physical layer data).

In a sub-embodiment of the foregoing embodiment, the downlink physical layer data channel is PDSCH.

In a sub-embodiment of the foregoing embodiment, the downlink physical layer data channel is sPDSCH.

In a sub-embodiment of the foregoing embodiment, the downlink physical layer data channel is NR-PDSCH.

In a sub-embodiment of the foregoing embodiment, the downlink physical layer data channel is NB-PDSCH.

In one embodiment, the DCI signaling carrying the fifth information is UE-specific.

In one embodiment, the signaling identifier of the DCI signaling carrying the fifth information is an SPS-C-RNTI.

In one embodiment, the fifth information is carried by DCI signaling identified by the SPS-C-RNTI.

In one embodiment, the DCI signaling that carries the fifth information is used for AUL DFI (Downlink Feedback Indication).

In one embodiment, the fifth information includes a HARQ-ACK (Acknowledgement) bitmap (HARQ-ACK bit map).

In one embodiment, the fifth information consists of a positive integer number of bits.

In one embodiment, the fifth information consists of 32 bits.

In one embodiment, the fifth information consists of 16 bits.

In one embodiment, a given bit in the fifth information corresponds to a given HARQ process number, and HARQ process number of the first wireless signal is the given HARQ process number. The given bit indicates whether the first wireless signal is received correctly.

In a sub-embodiment of the above embodiment, if the given bit is equal to 1, the first wireless signal is not correctly received; if the given bit is equal to 0, the first wireless signal is correctly received.

In a sub-embodiment of the above embodiment, if the given bit is equal to 0, the first wireless signal is not correctly received; if the given bit is equal to 1, the first wireless signal is correctly received.

In one embodiment, the DCI signaling that carries the fifth information includes whether the first wireless signal is correctly received and TPC (Transmitter Power Control).

In one embodiment, the DCI signaling that carries the fifth information includes the first parameter, whether the first wireless signal is correctly received and TPC.

In one embodiment, the DCI signaling carrying the fourth information and the DCI signaling carrying the fifth information have the same signaling identifier.

In one embodiment, the DCI signaling carrying the fourth information and the DCI signaling carrying the fifth information are DCIs identified by the same RNTI.

In one embodiment, the same RNTI is used to generate RS sequences of the DMRSs corresponding to the DCI signaling carrying the fourth information and the DCI signaling carrying the fifth information.

In one embodiment, the CRC bit sequence of the DCI signaling carrying the fifth information and the CRC bit sequence of the DCI signaling carrying the fourth information are scrambled by the same RNTI.

In one embodiment, the load size of the DCI signaling carrying the fifth information is equal to the load size of DCI Format 0A or the load size of DCI Format 4A.

In a sub-embodiment of the above embodiment, the specific definitions of DCI Format 0A and DCI Format 4A are refereed to chapter 5.3 of 3GPP TS 36.212.

In one embodiment, the load size of the DCI signaling that carries the fifth information is equal to the load size of the DCI signaling that carries the fourth information.

In one embodiment, the monitoring refers to blind detection, that is, receiving a signal and performing a decoding operation, and if determining the decoding is correct according to a CRC (Cyclic Redundancy Check) bit, then the first wireless signal is detected; otherwise, the first wireless signal is not detected.

In one embodiment, the monitoring refers to coherent detection, that is, coherent reception by using the RS sequence of the DMRS of the physical layer channel where the first wireless signal is on, and measuring the energy of the signal obtained after the coherent reception. If the energy of the signal obtained after the coherent reception is greater than a first given threshold, it is determined that the first wireless signal is detected; otherwise, the first wireless signal is not detected.

In one embodiment, the monitoring refers to energy detection, in which sensing the energy of the wireless signal and averaging over time to obtain received energy. If the received energy is greater than a second given threshold, the first wireless signal is detected; otherwise the first wireless signal is not detected.

In one embodiment, the monitored behavior is used by the N01 to determine an initial transmitting time of the first wireless signal from the first time domain resources of the first sub-band.

In one embodiment, the monitored behavior is used by the N01 to determine that the first wireless signal is detected in the first time domain resource of the first sub-band.

In one embodiment, the initial transmitting time of the first wireless signal is one of K candidate moments in the first time domain resource, and the K is a positive integer; the initial transmitting time of the first wireless signal is the earliest one of the K candidate moments detecting the first wireless signal.

In one embodiment, the monitored behavior is used by the N01 to determine the first time window from the M time windows.

In one embodiment, the monitored behavior is used by the N01 to determine that the first wireless signal is detected in the first time window.

In one embodiment, the first wireless signal is monitored respectively in M3 time windows; the M3 time windows is a subset of the M time windows, and the first time window is the latest one of the M3 time windows, the M3 is a positive integer less than the M.

Embodiment VI

Figure 6A:
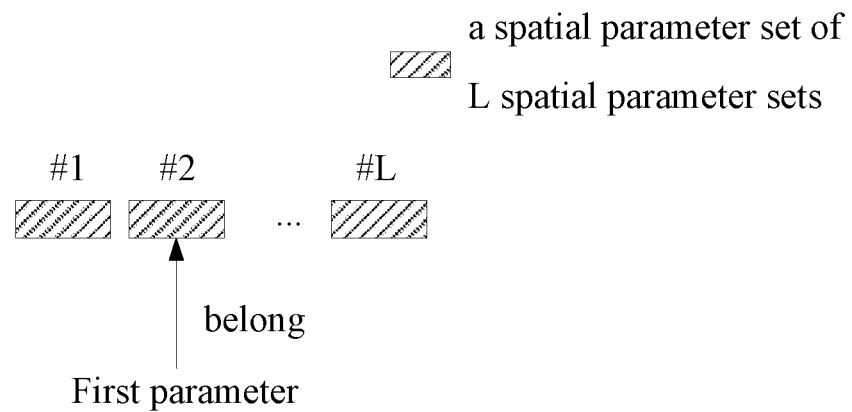
FIG. 6A to 6B respectively shows a schematic diagram of a first parameter associated to one of L spatial parameters sets according to one embodiment of the present disclosure.
Figure 6B:
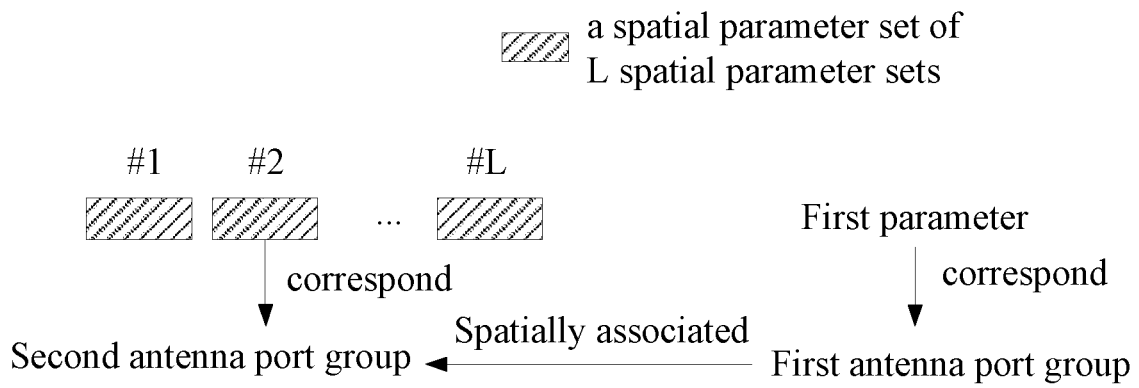

Embodiment VI Embodiments 6A to 6B respectively illustrate a schematic diagram in which a first parameter is associated with one of L spatial parameter sets, as shown in FIG. 6. In FIG. 6, the indexes of the L spatial parameter sets are #{1, . . . , L}, respectively.

In Embodiment 6A, the first parameter only belongs to one of the L spatial parameter sets.

In one embodiment, the first parameter does not belong to the L-1 spatial parameter sets in the L spatial parameter set.

In one embodiment, the first parameter includes at least one of {PMI, CRI, SRI, SSBRI}.

In one embodiment, the first parameter includes one of {PMI, CRI, SRI, SSBRI}.

In one embodiment, the first parameter comprises PMI.

In one embodiment, the first parameter comprises CRI.

In one embodiment, the first parameter comprises SRI.

In one embodiment, the first parameter comprises SSBRI.

In Embodiment 6B, the first parameter corresponds to the first antenna port group, and one of the L spatial parameter sets to which the first parameter is associated corresponds to the second antenna port group. The first antenna port group is spatially associated with the second antenna port group.

In one embodiment, the first parameter includes at least one of {PMI, CRI, SRI, SSBRI}.

In one embodiment, the first parameter includes one of {PMI, CRI, SRI, SSBRI}.

In one embodiment, the first parameter comprises PMI.

In one embodiment, the first parameter comprises CRI.

In one embodiment, the first parameter comprises SRI.

In one embodiment, the first parameter comprises SSBRI.

In one embodiment, the first antenna port group includes a transmit antenna port group of the wireless signal indicated by the first parameter.

In one embodiment, the first parameter includes CRI, and the first antenna port group includes a transmitting antenna port group of CSI-RS (Channel State Information-Reference Signal) indicated by CRI that included in the first parameter.

In one embodiment, the first parameter includes SRI, and the first antenna port group includes a transmit antenna port group of SRS (Sounding Reference Signal) indicated by the SRI that included in the first parameter.

In one embodiment, the first parameter includes SSBRI, and the first antenna port group includes a transmit antenna port group of SSB (Synchronization Signal Block) indicated by the SSBRI that included in the first parameter.

In one embodiment, the first parameter includes SSBRI, and the first antenna port group includes a transmit antenna port group of the synchronization signal indicated by the SSBRI that included in the first parameter.

In one embodiment, the second antenna port group includes an antenna port group corresponding to one or more spatial parameters in one of the L spatial parameter sets to which the first parameter is associated.

In one embodiment, the second antenna port group includes a transmitting antenna port group of a wireless signal indicated by one or more spatial parameter in the one of the L spatial parameter sets to which the first parameter is associated.

In one embodiment, the second antenna port group includes an antenna port group corresponding to one spatial parameter in the one of the L spatial parameter sets to which the first parameter is associated.

In one embodiment, the second antenna port group includes a transmitting antenna port group of a wireless signal indicated by one spatial parameter in the one of the L spatial parameter sets to which the first parameter is associated.

In one embodiment, the second antenna port group includes an antenna port group corresponding to multiple spatial parameters in the one of the L spatial parameter sets to which the first parameter is associated.

In one embodiment, the second antenna port group includes a transmitting antenna port group of a wireless signal indicated by multiple spatial parameters in the one of the L spatial parameter sets to which the first parameter is associated.

In one embodiment, the second antenna port group includes an antenna port group corresponding to all spatial parameters in one the of the L spatial parameter sets to which the first parameter is associated.

In one embodiment, the second antenna port group includes a transmitting antenna port group of a wireless signal indicated by all spatial parameters in the one of the L spatial parameter sets to which the first parameter is associated.

In one embodiment, any spatial parameter set of the L spatial parameter sets except the one spatial parameter set to which the first parameter is associated corresponds to a third antenna port group, the first antenna port group is not spatially associated to the third antenna port group.

In a sub-embodiment of the foregoing embodiment, the third antenna port group includes an antenna port group corresponding to one or more spatial parameters in the any of the L spatial parameter sets except the spatial parameter set to which the first parameter is associated.

In a sub-embodiment of the foregoing embodiment, the third antenna port group includes a transmitting antenna port group of wireless signal indicated by one or more spatial parameters in the any of the L spatial parameter sets except a spatial parameter set to which the first parameter is associated.

In a sub-embodiment of the foregoing embodiment, the third antenna port group includes an antenna port group corresponding to any spatial parameter in any of the L spatial parameter sets except a spatial parameter set to which the first parameter is associated.

In a sub-embodiment of the foregoing embodiment, the third antenna port group includes a transmitting antenna port group of the wireless signal indicated by any spatial parameter in the any of the L spatial parameter sets except a spatial parameter set to which the first parameter is associated.

In a sub-embodiment of the foregoing embodiment, the third antenna port group includes an antenna port group corresponding to multiple spatial parameters in the any one of the L spatial parameter sets except a spatial parameter set to which the first parameter is associated.

In a sub-embodiment of the foregoing embodiment, the third antenna port group includes a transmitting antenna port group of wireless signal indicated by multiple spatial parameters in the any of the L spatial parameter sets except a spatial parameter set to which the first parameter is associated.

In a sub-embodiment of the foregoing embodiment, the third antenna port group includes an antenna port group corresponding to all spatial parameters in the any one of the L spatial parameter sets except a spatial parameter set to which the first parameter is associated.

In a sub-embodiment of the foregoing embodiment, the third antenna port group includes a transmitting antenna port group of the wireless signal indicated by all spatial parameters in the any one of the L spatial parameter sets except a spatial parameter set to which the first parameter is associated.

Embodiment VII

Figure 7A:
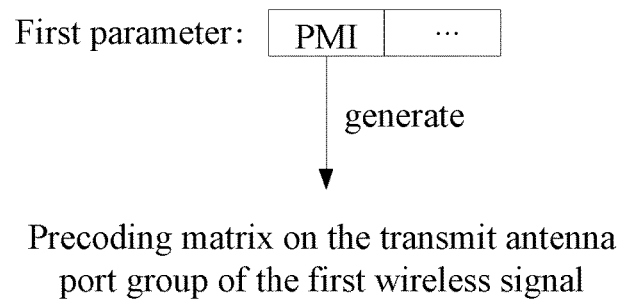
FIG. 7A- to 7B respectively show a schematic diagram of a first parameter used to determine transmitting antenna port group of a first wireless signal according to one embodiment of the present disclosure.
Figure 7B:
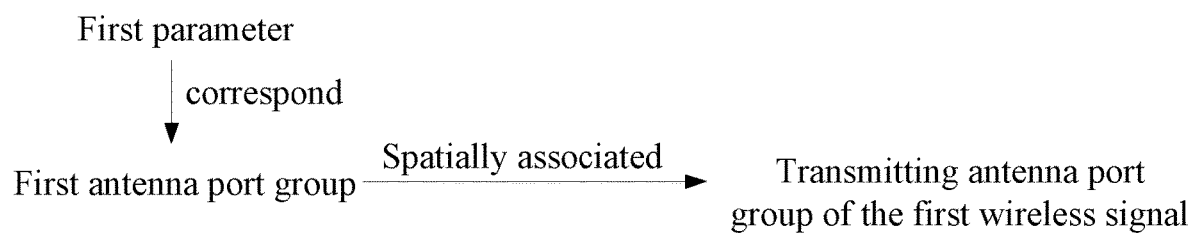
Figure 8A:
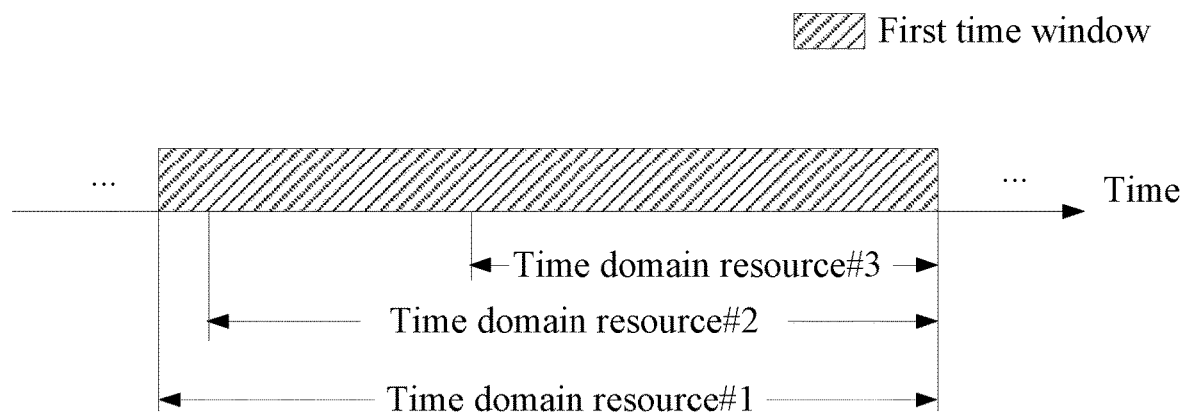
FIG. 8A to 8D respectively illustrates a schematic diagram of time domain location relationship of L time-domain resources according to one embodiment of the present disclosure.
Figure 8B:
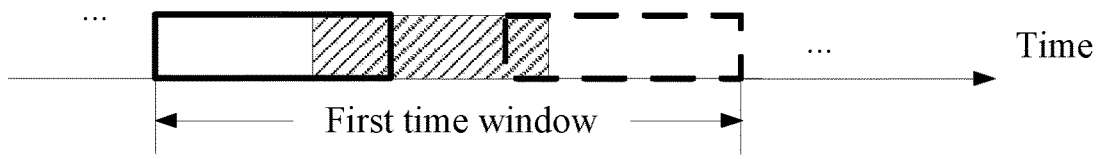
Figure 8C:
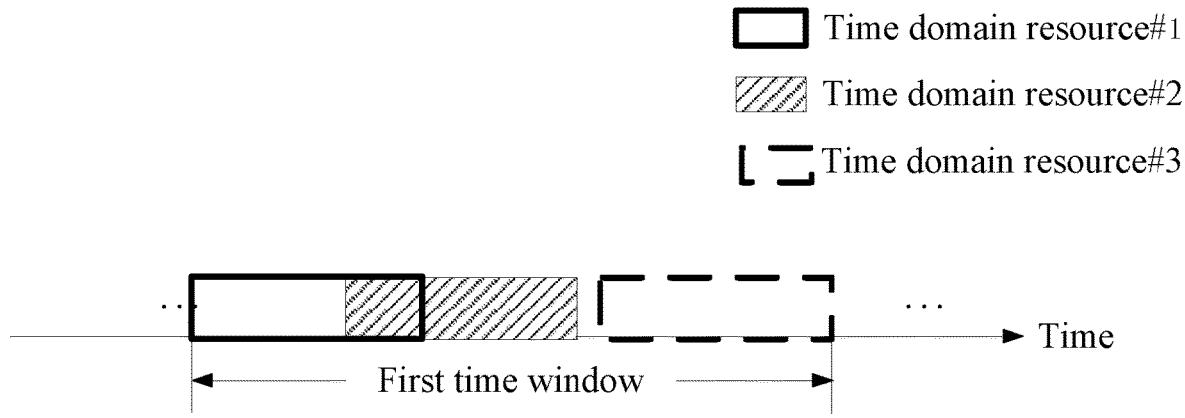
Figure 8D:
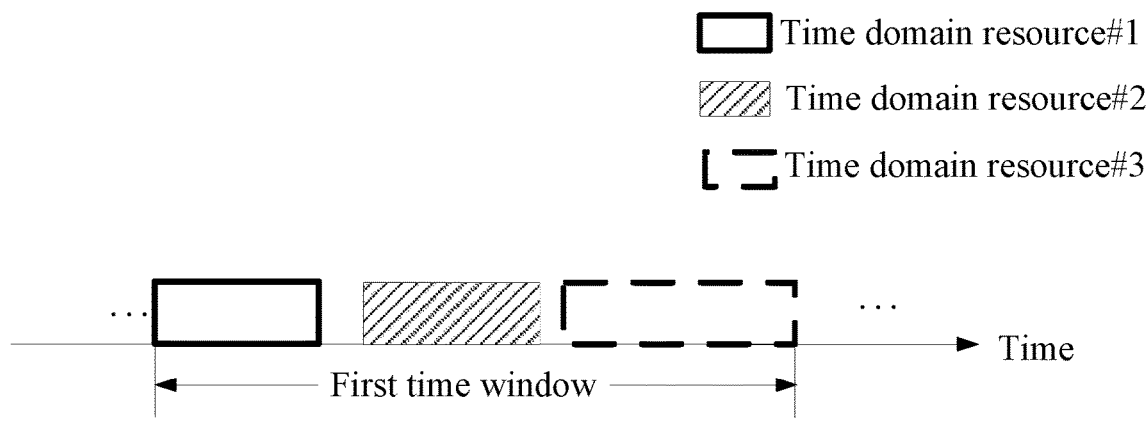

Embodiment VII 7A to 7B respectively illustrate a schematic diagram of a first parameter used to determine transmitting antenna port group of a first wireless signal, as shown in FIG. 7.

In Embodiment 7A, the first parameter includes PMI, and the PMI included in the first parameter is used to generate a precoding matrix on a transmitting antenna port group of the first wireless signal.

In one embodiment, the first parameter includes PMI, and the PMI included in the first parameter is used to generate a digital precoding matrix on a transmitting antenna port group of the first wireless signal.

In one embodiment, the first parameter includes PMI, and the PMI included in the first parameter is the same as a precoding matrix on a transmit antenna port group of the first wireless signal.

In one embodiment, the first parameter includes PMI, and the PMI included in the first parameter is the same as a digital precoding matrix on a transmit antenna port group of the first wireless signal.

In Embodiment 7B, the first parameter corresponds to a first antenna port group, and the first antenna port group is spatially associated to a transmitting antenna port group of the first wireless signal.

Embodiment VIII

Embodiments 8A to 8D respectively illustrate schematic diagrams of time domain location relationship of L time domain resources, as shown in FIG. 8.

In Embodiment VIII, the L time domain resources all belong to the first time window and any two of the L time domain resources are different from each other.

In one embodiment, any two of the L time domain resources overlap each other (not orthogonal) in the time domain.

In a sub-embodiment of the foregoing embodiment, the initial time of the L time domain resources are different from each other.

In a sub-embodiment of the foregoing embodiment, the termination time of the L time domain resources are the same.

In a sub-embodiment of the foregoing embodiment, the initial time of at least two time domain resources in the L time domain resources are different from each other.

In a sub-embodiment of the foregoing embodiment, the initial time of at least two time domain resources in the L time domain resources are the same.

In a sub-embodiment of the foregoing embodiment, the termination time of at least two of the L time domain resources are different from each other.

In a sub-embodiment of the foregoing embodiment, the termination time of at least two of the L time domain resources are the same.

In an embodiment, any two of the L time domain resources include at least one identical multi-carrier symbol.

In a sub-embodiment of the foregoing embodiment, the initial time of the L time domain resources are different from each other.

In a sub-embodiment of the foregoing embodiment, the termination time of the L time domain resources are the same.

In a sub-embodiment of the foregoing embodiment, the initial time of at least two time domain resources in the L time domain resources are different from each other.

In a sub-embodiment of the foregoing embodiment, the initial time of at least two time domain resources in the L time domain resources are the same.

In a sub-embodiment of the foregoing embodiment, the termination time of at least two of the L time domain resources are different from each other.

In a sub-embodiment of the foregoing embodiment, the termination time of at least two of the L time domain resources are the same.

In one embodiment, a given time domain resource is any one of the L time domain resources, and the given time domain resource and at least one of the L time domain resources except the given time domain resource overlap each other in the time domain (not orthogonal).

In one embodiment, the given time domain resource is any one of the L time domain resources, and the given time domain resource and at least one of the L time domain resources except the given time domain resource all include at least one identical multi-carrier symbol.

In one embodiment, at least two of the L time domain resources overlap each other (not orthogonal) in the time domain.

In one embodiment, at least two of the L time domain resources include at least one identical multi-carrier symbol.

In one embodiment, any two of the L time domain resources are orthogonal to each other in the time domain.

In one embodiment, any two of the L time domain resources do not include one same multi-carrier symbol.

In one embodiment, the embodiment 8A corresponds to any two time domain resources of the L time domain resources overlapping with each other in the time domain, and the schematic diagram of the time domain location relationship of the L time-domain resources with the L equal to 3.

In one embodiment, the embodiment 8B corresponding to the given time domain resource is any one of the L time domain resources, and the given time domain resource and at least one of the L time domain resources except the given time domain are overlapping with each other in the time domain, and the schematic diagram of the time domain location relationship of the L time-domain resources with the L equal to 3.

In one embodiment, the embodiment 8C corresponds to at least two time domain resources of the L time domain resources are overlapping each other in the time domain, and the schematic diagram of the time domain location relationship of the L time-domain resources with the L equal to 3.

In one embodiment, the embodiment 8D corresponds to any two time domain resources of the L time domain resources being orthogonal to each other in the time domain, and the schematic diagram of the time domain location relationship of the L time-domain resources with the L equal to 3.

Embodiment IX

Figure 9:
FIG. 9 shows a schematic diagram of a first time domain resource determined from L time domain resources according to an embodiment of the present disclosure.
Figure 9:
Figure 9:
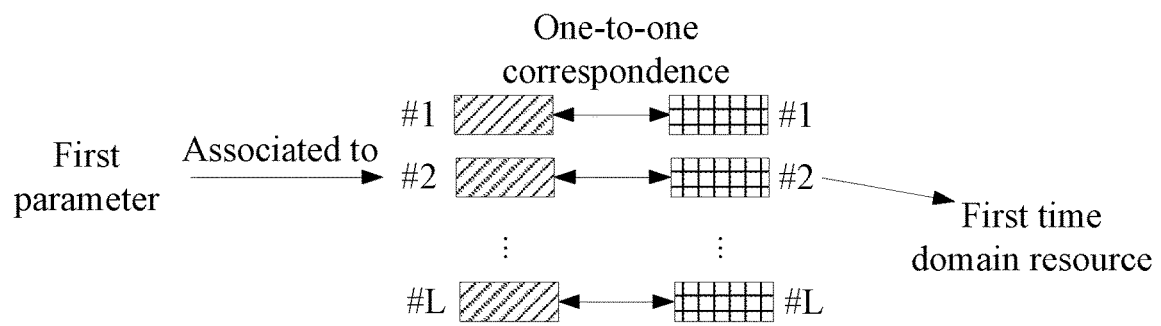

Embodiment IX exemplifies a schematic diagram of determining a first time domain resource from L time domain resources, as shown in FIG. 9.

In Embodiment IX, first spatial parameter set is one of the L spatial parameter sets to which the first parameter is associated in the present disclosure, and the first time domain resource is one of the L time domain resources corresponding to the first spatial parameter set.

Embodiment X

Embodiments 10A to 10B respectively illustrate a schematic diagram of time domain location of initial transmitting time of a first wireless signal in a first time domain resource, as shown in FIG. 10.

In the embodiment X, the initial transmitting time of the first wireless signal belongs to the first time domain resource.

In one embodiment, the termination transmitting time of the first wireless signal belongs to the first time domain resource.

In a sub-embodiment of the foregoing embodiment, the termination transmitting time of the first wireless signal is a termination time of the first time domain resource.

In a sub-embodiment of the foregoing embodiment, the termination transmitting time of the first wireless signal is a moment in the first time domain resource except the termination time of the first time domain resource.

In one embodiment, the initial transmitting time of the first wireless signal is the initial time of the first time domain resource.

In one embodiment, the initial transmitting time of the first wireless signal is one of K candidate times in the first time domain resource, and the K is a positive integer.

In a sub-embodiment of the above embodiment, the K is a positive integer greater than one.

In a sub-embodiment of the above embodiment, the K is equal to 1.

In a sub-embodiment of the foregoing embodiment, the initial time of the first time domain resource is one of the K candidate times.

In a sub-embodiment of the above embodiment, the K candidate times are different from each other.

In a sub-embodiment of the above embodiment, the K candidate times are predefined.

In a sub-embodiment of the above embodiment, the K candidate times are semi-statically configured.

In a sub-embodiment of the above embodiment, the K candidate times are configured by higher layer signaling.

In a sub-embodiment of the above embodiment, the K candidate times are configured by RRC signaling.

In a sub-embodiment of the above embodiment, the K candidate times are configured by MAC CE signaling.

In a sub-embodiment of the above embodiment, the K candidate times are indicated by system information.

In a sub-embodiment of the above embodiment, the K candidate times are configured by broadcast signaling.

In a sub-embodiment of the above embodiment, the K candidate times are dynamically configured.

In a sub-embodiment of the above embodiment, the K candidate times are configured by physical layer signaling.

In a sub-embodiment of the above embodiment, the K candidate times are configured by DCI signaling.

Figure 10A:
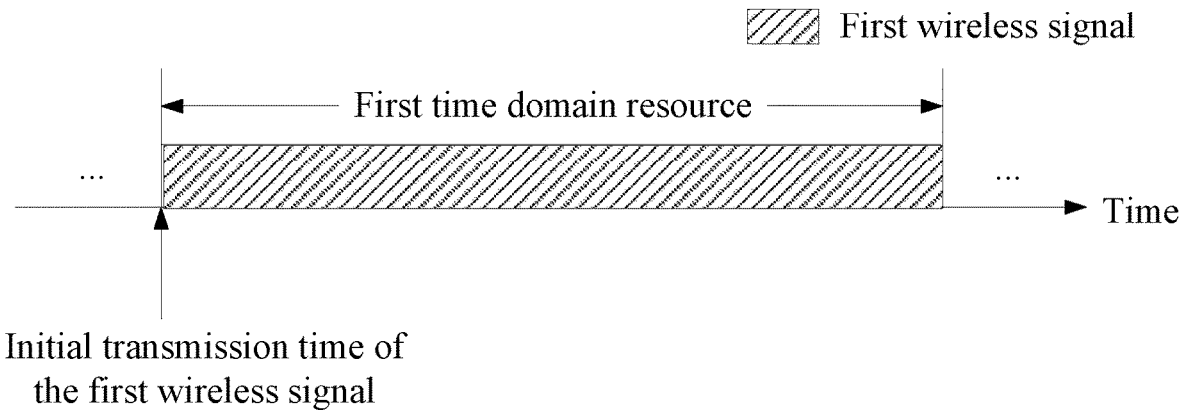
FIG. 10A to 10B respectively shows a schematic diagram of time domain location of initial transmitting time of a first wireless signal in the first time domain resource according to one embodiment of the present disclosure.

In an embodiment, the embodiment 10A corresponds to FIG. 10A, which shows that initial transmitting time of the first wireless signal is the initial time of the first time domain resource.

Figure 10B:
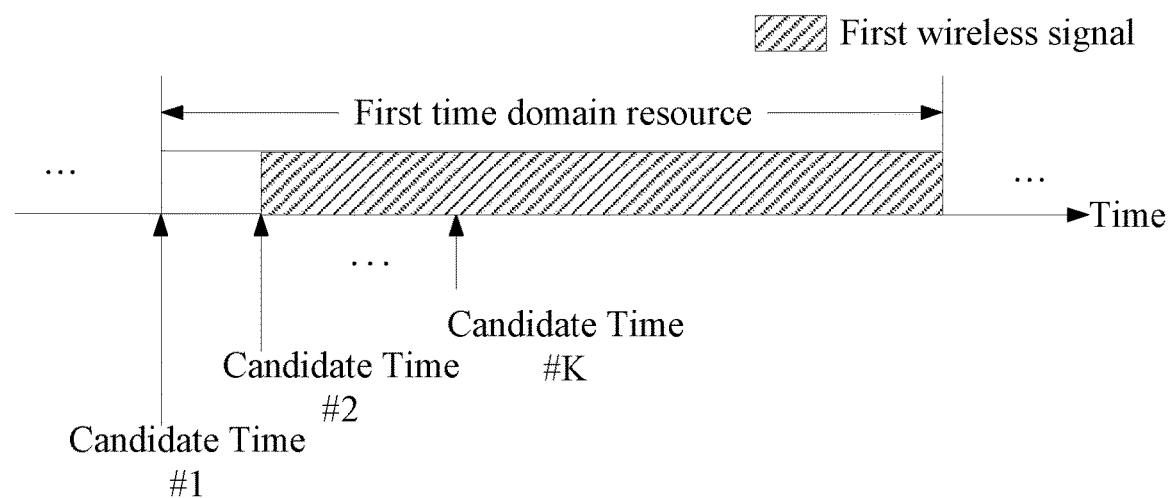

In one embodiment, the embodiment 10B corresponds to FIG. 10B, which shows that initial transmitting time of the first wireless signal is one of K candidate times.

Embodiment XI

Figure 11:
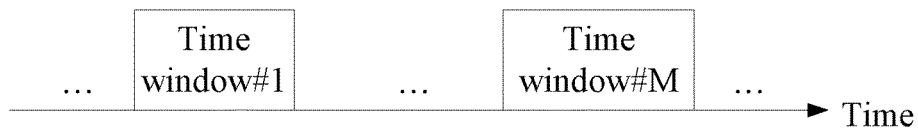
FIG. 11 shows a schematic diagram of time-domain distribution of the M time windows in accordance with one embodiment of the present disclosure.

Embodiment XI illustrates a schematic diagram of the distribution of one M time window in the time domain, as shown in FIG. 11.

In the embodiment XI, the third information in the present disclosure is used to determine the M time windows, and the first time window in the present disclosure is one of the M time windows; M is a positive integer greater than one. In FIG. 11, the indexes of the M time windows are #{1, 2, . . . , M}, respectively.

In one embodiment, any two of the M time windows are orthogonal to each other (not overlapping) in the time domain.

In one embodiment, any two adjacent time windows of the M time windows are discontinuous in the time domain.

In one embodiment, at least two adjacent time windows of the M time windows are continuous in the time domain.

In one embodiment, any two of the M time windows occupy the same length of time resources.

In one embodiment, at least two of the M time windows occupy the different lengths of time resources.

In one embodiment, any one of the M time windows includes a continuous time period.

In one embodiment, any one of the M time windows includes a positive integer number of consecutive slots.

In one embodiment, any one of the M time windows includes a positive integer number of consecutive subframes.

In one embodiment, any one of the M time windows includes a positive integer number of consecutive mini-slots.

In one embodiment, any one of the M time windows includes a slot.

In one embodiment, any one of the M time windows includes one subframe.

In one embodiment, any one of the M time windows includes a small slot.

In one embodiment, any one of the M time windows includes multiple consecutive slots.

In one embodiment, any one of the M time windows includes multiple consecutive subframes.

In one embodiment, any one of the M time windows includes multiple consecutive mini-slots.

In one embodiment, any one of the M time windows is composed of a positive integer number of consecutive multi-carrier symbols.

In one embodiment, any one of the M time windows is composed of multiple consecutive multi-carrier symbols.

Embodiment XII

Figure 12:
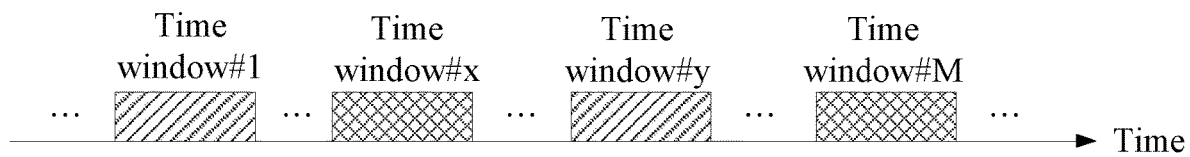
FIG. 12 shows a schematic diagram of a one-to-one correspondence between L spatial parameter sets and L time domain resources according to an embodiment of the present disclosure.

Embodiment XII illustrates a schematic diagram for determining a one-to-one correspondence between L spatial parameter sets and L time domain resources, as shown in FIG. 12.

Embodiment XII, the third information in this disclosure and the time domain location of the first time window are used together to determine a one-to-one correspondence relationship between the L spatial parameter sets and the L time domain resources.

Embodiment XII, the first time window is one of the M time windows; the third information and the time domain location of the first time window are used together to determine a one-to-one correspondence relationship between the L spatial parameter sets and the L time domain resources. The M time windows include M1 time windows and M2 time windows, wherein the M1 time windows and the M2 time windows are respectively subsets of the M time windows, and the M1 and the M2 are respectively positive integers less than the M. If the first time window is one of the M1 time windows, the one-to-one correspondence relationship between the L spatial parameter sets and the L time domain resources is a first candidate correspondence relationship; If the first time window is one of the M2 time windows, and the one-to-one correspondence relationship between the L spatial parameter sets and the L time domain resources is a second candidate correspondence relationship.

In FIG. 12, the indexes of the M time windows respectively are #{1, . . . , x, . . . , y, . . . , M}, wherein the x and the y respectively are positive integers not greater than the M, the y is greater than the x; a left-lined filled box represents a time window in the M1 time windows, and a cross-line filled box represents a time window in the M2 time windows.

In one embodiment, the third information and the time domain location of the first time window are used together to determine a one-to-one correspondence relationship between the L spatial parameter sets and the L time domain resources.

In one embodiment, the intersection of the M1 time windows and the M2 time windows is empty, that is, there is no time window in the M time windows belonging to the M1 time windows and the M2 time windows.

In one embodiment, the first candidate correspondence relationship and the second candidate correspondence relationship are different.

In one embodiment, the third information in this disclosure is further used to determine the M1 time windows, the M2 time windows, the first candidate correspondence relationship, and the second candidate correspondence relationship.

In one embodiment, the third information in this disclosure further indicates the M1 time windows, the M2 time windows, the first candidate correspondence relationship, and the second candidate correspondence relationship.

In one embodiment, the M time windows are composed of the M1 time windows and the M2 time windows.

In one embodiment, at least one of the M time windows does not belong to the M1 time window and the M2 time windows.

Embodiment XIII

Figure 13:
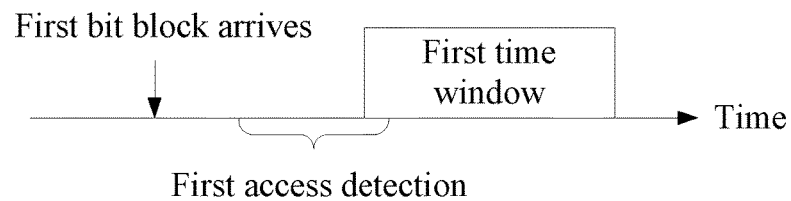
FIG. 13 shows a schematic diagram of self-selecting a first time window from the M time windows in accordance with one embodiment of the present disclosure.

Embodiment XIII illustrates a schematic diagram of self-selecting a first time window from M time windows, as shown in FIG. 13.

In embodiment XIII, the first wireless signal in the present disclosure is transmitted in the first time window, the first wireless signal carries a first bit block, and the first bit block includes a positive integer number of bits. The initial time of the first time window is later than the arrival time of the first bit block. The first access detection in the present disclosure is used to select the first time window from the M time windows.

In one embodiment, the first bit block includes uplink data.

In one embodiment, the arrival time of the first bit block refers to a time when the first bit block reaches the physical layer.

In one embodiment, the first access detection is used to determine that a wireless signal can be transmitted in the first time window of the first sub-band.

In one embodiment, the first time window is the earliest time window of the M time windows in which the initial time is later than the arrival time of the first bit block, and the first sub-band in the present disclosure is determined that can be used for transmitting wireless signal.

In one embodiment, the first time window is the earliest time window of the M time windows in which the initial time is later than the arrival time of the first bit block and the first sub-band in the present disclosure is idle.

As an embodiment, the first access detection is used to determine that the first sub-band is idle in the first time window.

Embodiment XIV

Embodiment 14A to 14B respectively illustrate a schematic diagram in which a first given antenna port group is spatially associated to a second given antenna port group.

In the embodiment XIV, the first given antenna port group corresponds to the first antenna port group in the present disclosure, and the second given antenna port group corresponds to the second antenna port group in the present disclosure; Alternatively, the first given antenna port group corresponds to the first antenna port group in the present disclosure, and the second given antenna port group corresponds to the transmitting antenna port group of the first wireless signal in the present disclosure.

In one embodiment, the first given antenna port group being spatially associated to the second given antenna port group, the second given antenna port group includes all antenna ports in the first given antenna port group.

In one embodiment, the first given antenna port group is spatially associated to the second given antenna port group, the transmitting or receiving antenna or antenna group of transmitting wireless signal on the second given antenna port group including all transmitting or receiving antennas or antenna groups of transmitting wireless signal on the first given antenna port group.

In one embodiment, the first given antenna port group is spatially associated to the second given antenna port group, and the transmitting antenna or antenna group of transmitting wireless signal on the second given antenna port group including all transmitting antennas or antenna groups of transmitting wireless signal on the first given antenna port group.

In one embodiment, the first given antenna port group is spatially associated to the second given antenna port group, and the receiving antenna or antenna group of transmitting wireless signal on the second given antenna port group including all receiving antennas or antenna groups of transmitting wireless signal on the first given antenna ports group.

In one embodiment, the first given antenna port group is spatially associated to the second given antenna port group, and the transmitting antenna or antenna group of transmitting wireless signal on the second given antenna port group including all receiving antennas or antenna groups of transmitting wireless signal on the first given antenna port group.

In one embodiment, the first given antenna port group is spatially associated to the second given antenna port group, and the receiving antenna or antenna group of a transmitting wireless signal on the second given antenna port group including all transmitting antennas or antenna group of transmitting wireless signal on the first given antenna port group.

In one embodiment, the first given antenna port group is spatially associated to the second given antenna port group, and the second antenna group is one or more antenna groups generating multiple antenna related transmission or multiple antenna related reception of the transmitting wireless signal on the second given antenna port group, and the first antenna group is one or more antenna groups generating multiple antenna related transmission or multiple antenna related reception of the transmitting wireless signal on the first given antenna port group, the second antenna group including all antennas or antenna groups in the first antenna group.

In one embodiment, the first given antenna port group is spatially associated to the second given antenna port group, and the second antenna group is one or more antenna groups generating multiple antenna related transmission of the transmitting wireless signal on the second given antenna port group, the first antenna group is one or more antenna groups generating multiple antenna related transmission of the transmitting wireless signal on the first given antenna port group, the second antenna group includes all antennas or antenna groups in the first antenna group.

In one embodiment, the first given antenna port group is spatially associated to the second given antenna port group, and the second antenna group is one or more antenna groups generating multiple antenna related reception of the transmitting wireless signal on the second given antenna port group, the first antenna group is one or more antenna groups generating multiple antenna related reception of the transmitting wireless signal on the first given antenna port group, the second antenna group includes all antennas or antenna groups in the first antenna group In one embodiment, the first given antenna port group is spatially associated to the second given antenna port group, and the second antenna group is one or more antenna groups generating multiple antenna related transmission of the transmitting wireless signal on the second given antenna port group, the first antenna group is one or more antenna groups generating multiple antenna related reception of the transmitting wireless signal on the first given antenna port group, the second antenna group includes all antennas or antenna groups in the first antenna group.

In one embodiment, the first given antenna port group being spatially associated to the second given antenna port group means that the second given antenna port group includes a portion antenna port(s) in the first given antenna port group, any antenna port in the first given antenna port group not belonging to the second given antenna port group and at least one of the second given antenna ports is QCL (Quasi Co-Located).

In one embodiment, the first given antenna port group being spatially associated to the second given antenna port group means that the second given antenna port group includes a portion antenna port(s) in the first given antenna port group, any antenna port in the first given antenna port group not belonging to the second given antenna port group and one of the second given antenna ports is QCL.

In one embodiment, the first given antenna port group being spatially associated to the second given antenna port group means that the second given antenna port group includes a portion antenna port(s) in the first given antenna port group, any antenna port in the first given antenna port group not belonging to the second given antenna port group and at least one of the second given antenna ports is Spatial QCL.

In one embodiment, the first given antenna port group being spatially associated to the second given antenna port group means that the second given antenna port group includes a portion antenna port(s) in the first given antenna port group, any antenna port in the first given antenna port group not belonging to the second given antenna port group and one of the second given antenna ports is Spatial QCL.

In one embodiment, the first given antenna port group being spatially associated to the second given antenna port group means that any antenna port in the first given antenna port group and at least one antenna port in the second given antenna port group is QCL.

In one embodiment, the first given antenna port group being spatially associated to the second given antenna port group means that any antenna port in the first given antenna port group and one antenna port in the second given antenna port group is QCL.

In one embodiment, the first given antenna port group being spatially associated to the second given antenna port group means that any antenna port in the first given antenna port group and at least one antenna port in the second given antenna port group is spatial QCL.

In one embodiment, the first given antenna port group being spatially associated to the second given antenna port group means that any antenna port in the first given antenna port group and one antenna port in the second given antenna port group is spatial QCL.

In one embodiment, two antenna ports are QCL means that all or part of the large-scale properties of the wireless signal transmitted from one of the two antenna ports can infer all or part of the large-scale characteristics of the wireless signal transmitted on the other one of the two antenna ports.

In one embodiment, the two antenna ports being QCL means that the two antenna ports have at least one identical QCL parameter, and the QCL parameters include multiple antenna related QCL parameters and multiple antenna independent QCL parameters.

In one embodiment, the two antenna ports are QCL, in which at least one QCL parameter of one antenna port of the two antenna ports can infer at least one QCL parameter of the other one of the two antenna ports.

In one embodiment, the two antenna ports are QCL means that the multi-antenna related reception of the wireless signal transmitted from one of the two antenna ports can infer the multi-antenna related reception of wireless signal transmitted on the other one of the two antenna ports.

In one embodiment, the two antenna ports being QCL means that the multi-antenna related transmission of the wireless signal transmitted from one of the two antenna ports can infer the multi-antenna related transmission of wireless signal transmitted on the other one of the two antenna ports.

As an embodiment, the two antenna ports are QCL means that the multi-antenna related reception of the wireless signal transmitted from one of the two antenna ports can infer the multi-antenna related transmission of wireless signal transmission on the other one of the two antenna ports, receiver of the wireless signal transmitted on the one of the two antenna ports is the same as the transmitter of the wireless signal transmitted on the other antenna port of the two antenna ports.

In one embodiment, the multi-antenna related QCL parameters include one or more kind of angle of arrival, angle of departure, spatial correlation, multi-antenna related transmission, and multi-antenna related reception.

In one embodiment, the multi-antenna independent QCL parameters includes one or more kind of delay spread, Doppler spread, Doppler shift, path loss, average gain.

In one embodiment, the two antenna ports are spatial QCL means that all or part of multi-antenna related large-scale properties of a wireless signal transmitted from one of the two antenna ports can infer all or part of the multi-antenna-related large-scale properties of the wireless signal transmitted on the other one of the two antenna ports.

In one embodiment, the two antenna ports are spatial QCL means that the two antenna ports have at least one identical multi-antenna related QCL parameter.

In one embodiment, the two antenna ports are spatial QCL, which means that at least one multiple antenna-related QCL parameter of one of the two antenna ports can infer at least one multiple antenna-related QCL parameter of the other one of the two antenna ports.

In one embodiment, the two antenna ports are spatial QCL means that the multi-antenna related reception of the wireless signal transmitted from one of the two antenna ports can infer the multi-antenna related reception of wireless signal transmitted on the other one of the two antenna ports.

In one embodiment, the two antenna ports are spatial QCL means that the multi-antenna related transmission of the wireless signal transmitted from one of the two antenna ports can infer the multi-antenna related transmission of wireless signal transmitted on the other one of the two antenna ports.

In one embodiment, the two antenna ports are spatial QCL, which means that the multi-antenna related reception of the wireless signal transmitted from one of the two antenna ports can infer the multi-antenna related transmission of wireless signal transmitted on the other one of the two antenna ports, a receiver of a wireless signal transmitted on the one of the two antenna ports is the same as the transmitter of the wireless signal transmitted on the other antenna port of the two antenna ports.

In one embodiment, the multi-antenna related large-scale properties of a given wireless signal include one or more kind of angle of arrival, angle of departure, spatial correlation, multi-antenna related transmission, and multi-antenna related reception.

In one embodiment, the multi-antenna related reception is spatial Rx parameter.

In one embodiment, the multi-antenna related reception is receiving beam.

In one embodiment, the multi-antenna related reception is receiving beamforming matrix.

In one embodiment, the multi-antenna related reception is receiving analog beam shaping matrix.

In one embodiment, the multi-antenna related reception is receiving beamforming vector.

In one embodiment, the multi-antenna related reception is receiving spatial filtering.

In one embodiment, the multi-antenna related transmission is spatial transmission parameter (Spatial Tx parameters).

In one embodiment, the multi-antenna related transmission is transmitting beam.

In one embodiment, the multi-antenna related transmission is transmitting beam shaping matrix.

In one embodiment, the multi-antenna related transmission is transmitting analog beamforming matrix.

In one embodiment, the multi-antenna related transmission is transmitting beamforming vector.

In one embodiment, the multi-antenna related transmission is transmitting spatial filtering.

Figure 14A:
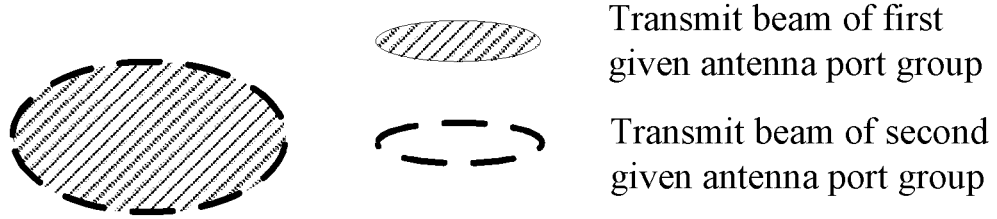
FIG. 14A to 14B respectively illustrates a schematic diagram of a first given antenna port group is associated to the second given antenna port group on the space according to an embodiment of the present disclosure.

In one embodiment, the embodiment 14A corresponds FIG. 14A, which shows that the transmission beam of the first given antenna port group is the same as the transmission beam of the second given antenna port group.

Figure 14B:
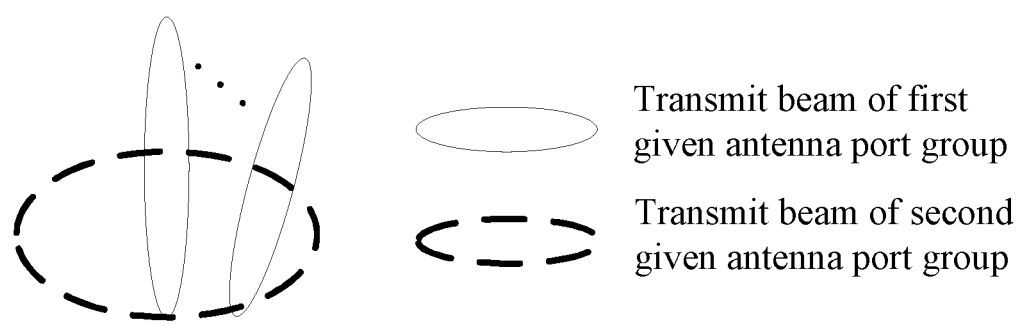

As an embodiment, the embodiment 14B corresponds to FIG. 14B, which shows that the transmitting beam of the second given antenna port group includes the transmitting beam of the first given antenna port group.

Embodiment XV

Embodiments 15A to 15B respectively illustrate a schematic diagram in which a first given antenna port group is not spatially associated to a second given antenna port group.

Embodiment XV, the first given antenna port group corresponds to the first antenna port group in the present disclosure, and the second given antenna port group corresponds to the third antenna port group in the present disclosure.

In one embodiment, the first given antenna port group is not spatially associated with the second given antenna port group, which means that the second given antenna port group does not include all antenna ports of the first given antenna group.

In one embodiment, the first given antenna port group is not spatially associated with the second given antenna port group, which means that the second given antenna port group does not include at least one antenna port of the first given antenna group.

In one embodiment, the first given antenna port group is not spatially associated with the second given antenna port group, which means that all antenna ports in the second given antenna port group and all antenna ports in the first given antenna port group are all able to simultaneously transmit wireless signal.

In one embodiment, the first given antenna port group is not spatially associated with the second given antenna port group, meaning that the wireless signal transmitted on any one antenna port in the second given antenna port group can be simultaneously received with the wireless signal transmitted on any one antenna port in the first given antenna port group.

In one embodiment, the first given antenna port group is not spatially associated with the second given antenna port group, meaning that simultaneously transmitting a wireless signal on any one antenna port of the second given antenna port group and receiving a wireless signal transmitted on any one antenna port in the first given antenna port group.

In one embodiment, the first given antenna port group is not spatially associated with the second given antenna port group, meaning that simultaneously transmitting a wireless signal on any one antenna port in the first given antenna port group and receiving a wireless signal transmitted on any one antenna port in the second given antenna port group.

In one embodiment, the first given antenna port group is not spatially associated with the second given antenna port group, which means that simultaneously transmitting or receiving a wireless signal on any antenna port of the first given antenna port group and transmitting or receiving a wireless signal on any antenna port of the second given antenna port group.

In one embodiment, the first given antenna port group is not spatially associated with the second given antenna port group, which means the transmitting or receiving antenna or antenna group for transmitting wireless signal on any antenna port in the second given antenna port group and the transmitting or receiving antenna or antenna group for transmitting wireless signal on any antenna port in the first given antenna port group do not include the same antenna or antenna group.

In one embodiment, the first given antenna port group is not spatially associated with the second given antenna port group, meaning that the antenna or antenna group for transmitting wireless signal on any antenna port in the second given antenna port group and the antenna or antenna group for transmitting wireless signal on any antenna port in the first given antenna port group do not include the same antenna or antenna group.

In one embodiment, the first given antenna port group is not spatially associated with the second given antenna port group, meaning that the receiving antenna or antenna group for transmitting wireless signal on any antenna port in the second given antenna port group and the receiving antenna or antenna group for transmitting wireless signal on any antenna port in the first given antenna port group do not include the same antenna or antenna group.

In one embodiment, the first given antenna port group is not spatially associated with the second given antenna port group, meaning that the antenna or antenna group for transmitting wireless signal on any antenna port in the second given antenna port group and the receiving antenna or antenna group for transmitting wireless signal on any antenna port in the first given antenna port group do not include the same antenna or antenna group.

In one embodiment, the first given antenna port group is not spatially associated with the second given antenna port group, meaning that: the antenna or antenna group for transmitting wireless signal on any antenna port in the first given antenna port group and the receiving antenna or antenna group for transmitting wireless signal on any antenna port in the second given antenna port group do not include the same antenna or antenna group.

In one embodiment, the first given antenna port group is not spatially associated with the second given antenna port group, which means the second antenna group is one or more antenna groups that generate multi-antenna-related transmission or multi-antenna-related reception of transmitting wireless signal on any antenna port of the second given antenna port group, and the first antenna group is one or more antenna groups that generate multi-antenna-related transmission or multi-antenna-related reception of any antenna port of the first given antenna port group, the first antenna group and the second antenna group do not include the same antenna or antenna group.

In one embodiment, the first given antenna port group is not spatially associated with the second given antenna port group, which means that the second antenna group is one or more antenna groups that generate multi-antenna-related transmission of transmitting wireless signal on any antenna port of the second given antenna port group, the first antenna group is one or more antenna groups that generate multi-antenna-related transmission of any antenna port in the first given antenna port group, the first antenna group and the second antenna group are not included the same antenna or antenna group.

In one embodiment, the first given antenna port group is not spatially associated with the second given antenna port group, which means that the second antenna group is one or more antenna groups that generate multiple antenna-related receipts of transmitting wireless signal on any antenna port of the second given antenna port group, the first antenna group is one or more antenna groups that generate multiple antenna-related receipts of any antenna port of the first given antenna port group, the first antenna group and the second antenna group are not included the same antenna or antenna group.

As an embodiment, the first given antenna port group is not spatially associated with the second given antenna port group, which means that the second antenna group is one or more antenna groups that generate multiple antenna-related transmission of transmitting wireless signal on any antenna port in the second given antenna port group, the first antenna group is one or more antenna groups that generate multiple antenna-related reception of any antenna port in the first given antenna port group, the first antenna group and the second antenna group are not included the same antenna or antenna group.

In one embodiment, the first given antenna port group is not spatially associated with the second given antenna port group, which means that the second antenna group is one or more antenna groups that generate multiple antenna-related reception of transmitting wireless signal on any antenna port in the second given antenna port group, the first antenna group is one or more antenna groups that generate multiple antenna-related transmission of any antenna port in the first given antenna port group, the first antenna group and the second antenna group are not included the same antenna or antenna group.

In one embodiment, the first given antenna port group is not spatially associated with the second given antenna port group, means that at least one antenna port in the first given antenna port group cannot transmit wireless signal simultaneously with at least one antenna port in the second given antenna port group.

In one embodiment, the first given antenna port group is not spatially associated with the second given antenna port group, means that the transmission or reception of a wireless signal on at least one antenna port in the first given antenna port group and the transmission or reception of a wireless signal on at least one antenna port in the second given antenna port group cannot be performed simultaneously.

In one embodiment, the first given antenna port group is not spatially associated with the second given antenna port group, means that receiving a transmitting wireless signal on at least one antenna port in the first given antenna port group and receiving a transmitting wireless signal on at least one antenna port in the second given antenna port group cannot be performed simultaneously.

In one embodiment, the first given antenna port group is not spatially associated with the second given antenna port group, means that transmitting the wireless signal on at least one antenna port in the first given antenna port group and receiving the transmitting wireless signal on at least one antenna port in the second given antenna port group cannot be performed simultaneously.

In one embodiment, the first given antenna port group is not spatially associated with the second given antenna port group, means that the transmission of the wireless signal on at least one antenna port in the second given antenna port group and the reception of the transmitted wireless signal on at least one antenna port in the first given antenna port group cannot performed simultaneously.

In one embodiment, the first given antenna port group is not spatially associated with the second given antenna port group, means that any antenna port in the first given antenna port group cannot simultaneously transmit wireless signal with at least one antenna port in the second given antenna port group.

In one embodiment, the first given antenna port group is not spatially associated with the second given antenna port group, means that the transmission or reception of a wireless signal on any one the antenna ports of the first given antenna port group and the transmission or reception of a wireless signal on at least one antenna port of the second given antenna port group cannot performed simultaneously.

In one embodiment, the first given antenna port group is not spatially associated with the second given antenna port group, means that the reception of a transmitting wireless signal on any one antenna port in the first given antenna ports group and the reception of a transmitting wireless signal on at least one antenna port in the second given antenna ports group cannot be performed simultaneously.

In one embodiment, the first given antenna port group is not spatially associated with the second given antenna port group, means that the transmission of a wireless signal on any one antenna ports of the first given antenna port group and the reception of a transmitting wireless signal on at least one antenna port in the second given antenna port group cannot be performed simultaneously.

In one embodiment, the first given antenna port group is not spatially associated with the second given antenna port group, means that the transmission of a wireless signal on at least one antenna port in the second given antenna port group and the reception of a transmitting wireless signal on any antenna port in the first given antenna port group cannot be performed simultaneously.

In one embodiment, the first given antenna port group is not spatially associated with the second given antenna port group, and the transmitting or receiving antenna or antenna group for transmitting wireless signal on the second given antenna port group includes at least one transmitting or receiving antenna or antenna group for transmitting wireless signal on the first given antenna port group.

In one embodiment, the first given antenna port group is not spatially associated with the second given antenna port group, the transmitting antenna or antenna group of wireless signal on the second given antenna port group includes at least one transmitting antenna or antenna group of wireless signal on the first given antenna port group.

In one embodiment, the first given antenna port group is not spatially associated with the second given antenna port group, and the receiving antenna or antenna group of transmitting wireless signal on the second given antenna port group includes at least one receiving antenna or antenna group of transmitting wireless signal on the first given antenna port group.

In one embodiment, the first given antenna port group is not spatially associated with the second given antenna port group, and the transmitting antenna or antenna group for transmitting wireless signal on the second given antenna port group includes at least one receiving antenna or antenna group for transmitting wireless signal on the first given antenna port group.

In one embodiment, the first given antenna port group is not spatially associated with the second given antenna port group, and the receiving antenna or antenna group for transmitting wireless signal on the second given antenna port group includes at least one transmitting antenna or antenna group for transmitting wireless signal on the first given antenna port group.

In one embodiment, the first given antenna port group is not spatially associated with the second given antenna port group, and the second antenna group is one or more antenna groups that generate multi-antenna-related transmission or multi-antenna-related reception of transmitting wireless signal on the second given antenna port group, the first antenna group is one or more antenna groups that generate multi-antenna-related transmission or multi-antenna-related reception of transmitting wireless signal on the first given antenna port group, the second antenna group includes at least one antenna or antenna group in the first antenna group.

In one embodiment, the first given antenna port group is not spatially associated with the second given antenna port group, and the second antenna group is one or more antenna groups that generate multiple antenna-related transmission of transmitting wireless signal on the second given antenna port group, the first antenna group is one or more antenna groups that generate multiple antenna-related transmission of transmitting wireless signal on the first given antenna port group, the second antenna group includes at least one antenna or antenna group in the first antenna group.

In one embodiment, the first given antenna port group is not spatially associated with the second given antenna port group, and the second antenna group is one or more antenna groups that generate multiple antenna-related receipts for transmitting wireless signal on the second given antenna port group, the first antenna group is one or more antenna groups that generate multiple antenna-related reception for transmitting wireless signal on the first given antenna port group, the second antenna group includes at least one antenna or antenna in the first antenna group.

In one embodiment, the first given antenna port group is not spatially associated with the second given antenna port group, and the second antenna group is one or more antenna groups that generate multiple antenna-related transmission of transmitting wireless signal on the second given antenna port group, the first antenna group is one or more antenna groups that generate multiple antenna-related reception of transmitting wireless signal on the first given antenna port group, the second antenna group includes at least one antenna or antenna group in the first antenna group.

In one embodiment, the first given antenna port group is not spatially associated with the second given antenna port group, and the second antenna group is one or more antenna groups that generate multiple antenna-related reception of transmitting wireless signal on the second given antenna port group, the first antenna group is one or more antenna groups that generate multiple antenna-related transmission of transmitting wireless signal on the first given antenna port group, the second antenna group includes at least one antenna or antenna group in the first antenna group.

In one embodiment, the first given antenna port group is not spatially associated with the second given antenna port group, means that any one antenna port in the first given antenna port group and any antenna port in the second given antenna port group is not QCL.

In one embodiment, the first given antenna port group is not spatially associated with the second given antenna port group, means that at least one antenna port in the first given antenna port group and any antenna port in the second given antenna port group is not QCL.

In one embodiment, the first given antenna port group is not spatially associated with the second given antenna port group, means that any antenna port in the first given antenna port group and any antenna port of the second given antenna port group is not spatial QCL.

In one embodiment, the first given antenna port group is not spatially associated with the second given antenna port group, means that at least one antenna port in the first given antenna port group and any antenna port in the second given antenna port group is not spatial QCL.

In one embodiment, two antenna ports are not QCL, which means that the whole or part of the large scale properties of wireless signal transmitted on one of the two antenna ports cannot infer the whole or part of the large scale properties of the wireless signal transmitted on the other one of the two antennas.

In one embodiment, two antenna ports are not QCL means that the two antenna ports have at least one different QCL parameter, and the QCL parameters include multi-antenna related QCL parameters and multi-antenna independent QCL parameters.

In one embodiment, the two antenna ports are not QCL means that at least one OCL parameter of one of the two antenna ports cannot infer at least one QCL parameter of the other antenna port of the two antenna ports.

In one embodiment, the two antenna ports are not QCL means that the multi-antenna related reception of the wireless signal transmitted on the one of the two antenna ports cannot infer the multi-antenna-related reception of the wireless signal transmitted on the other antenna port of the two antenna ports.

In one embodiment, the two antenna ports are not QCL means that the multi-antenna related transmission of the wireless signal transmitted on one of the two antenna ports cannot infer the multi-antenna related transmission of the wireless signal transmitted on the another antenna port of the two antenna port.

In one embodiment, the two antenna ports are not QCL means that the multi-antenna related reception of the wireless signal transmitted on the one of the two antenna ports cannot infer the multi-antenna-related transmission of the wireless signal transmitted on the other antenna port of the two antenna ports, the receiver of the wireless signal transmitted on the one of the two antenna ports is the same as the transmitter of the wireless signal transmitted on the other antenna port of the two antenna ports.

In one embodiment, the two antenna ports are not spatial QCL means that the whole or part of multi-antenna-related large scale properties of wireless signal transmitted on one of the two antenna ports cannot infer the whole or part of the multi-antenna-related large scale properties of the wireless signal transmitted on the other of the two antennas.

In one embodiment, the two antenna ports are not spatial QCL, which means that the two antenna ports have at least one different multi-antenna related QCL parameter.

In one embodiment, the two antenna ports are not spatial QCL means that at least one multi-antenna related QCL parameter of one of the two antenna ports cannot inferred at least one multi-antenna related QCL parameters of the other antenna port of the two antenna ports.

In one embodiment, the two antenna ports are not spatial QCL, which means that the multi-antenna related reception of the wireless signal transmitted on the one of the two antenna ports cannot infer the multi-antenna related reception of wireless signal transmitted on the other antenna port the two antenna ports.

In one embodiment, the two antenna ports are not spatial QCL, which means that the multi-antenna related transmission of the wireless signal transmitted on the one of the two antenna ports cannot infer the multi-antenna related transmission of wireless signal transmitted on the other of two antenna ports.

In one embodiment, the two antenna ports are not spatial QCL, which means that the multi-antenna related reception of the wireless signal transmitted on the one of the two antenna ports cannot infer the multi-antenna related transmission of wireless signal transmitted on the other of two antenna ports, the receiver of the wireless signal transmitted on the one of the two antenna ports is the same as the transmitter of the wireless signal transmitted on the other antenna port of the two antenna ports.

Figure 15A:
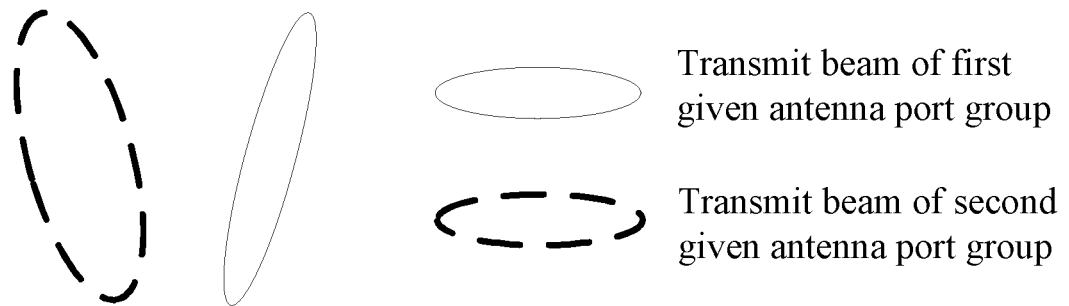
FIG. 15A to 15B respectively show a schematic diagram of a first given antenna port group is not associated to the second given antenna port group on the space according to an embodiment of the present disclosure.
Figure 15B:
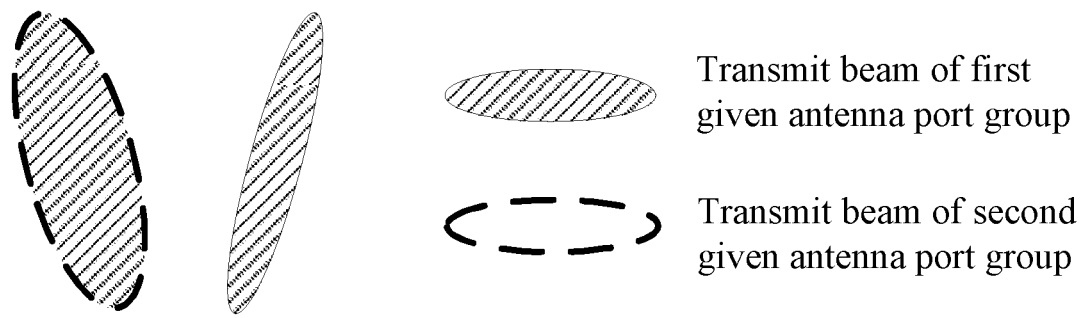

In one embodiment, the embodiment 15A corresponds to FIG. 15A, which shows that the transmit beam of the first given antenna port group and the transmit beam of the second given antenna port group are different.

In one embodiment, the embodiment 15B corresponds to FIG. 15A, which shows the transmit beam of the second given antenna port group includes only partial transmit beam of the first given antenna port group.

Embodiment XVI

Figure 16:
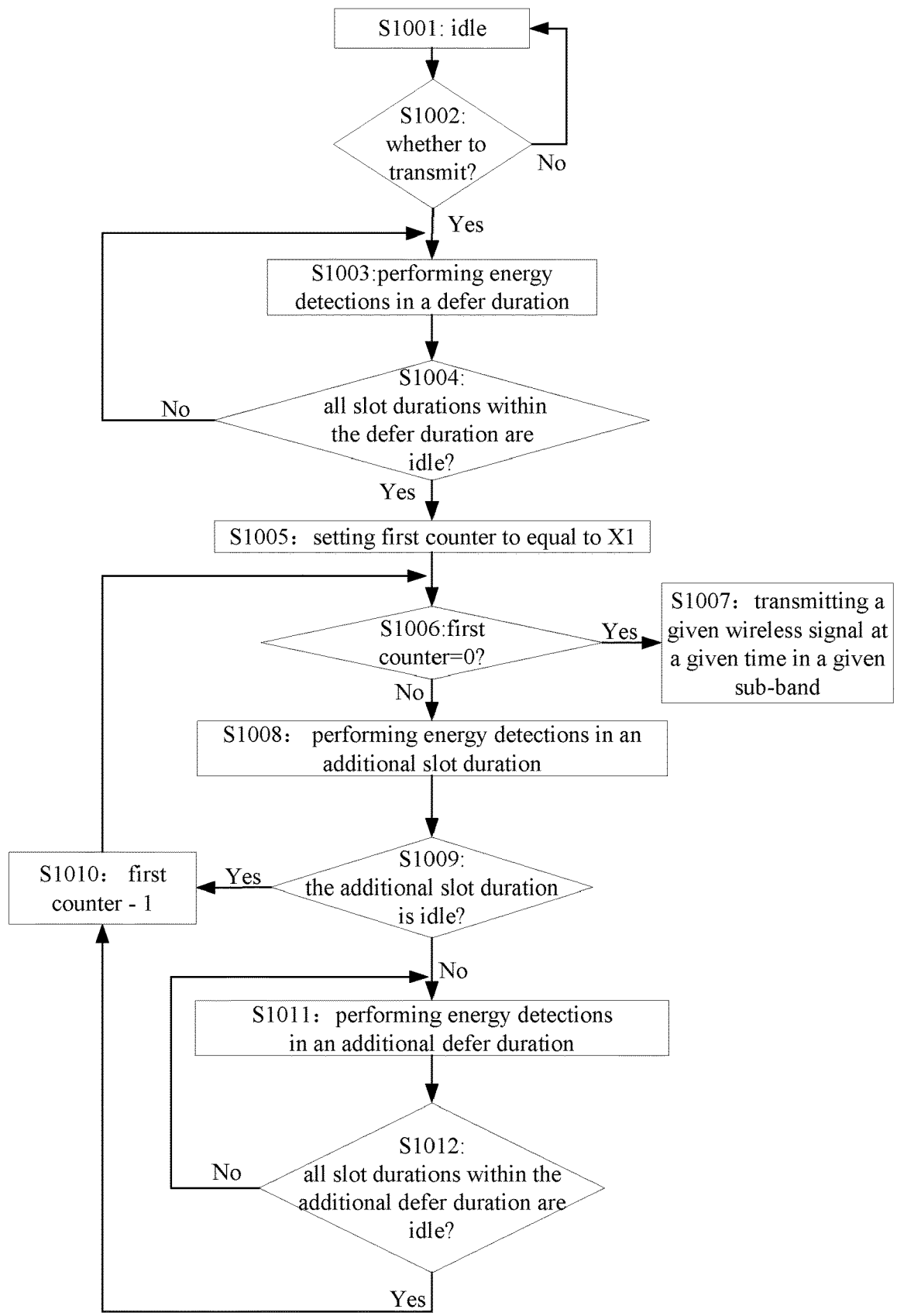
FIG. 16 shows a schematic diagram of a given access detection being used to determine whether a given wireless signal is transmitted at a given time of a given sub-band in accordance with an embodiment of the present disclosure.

Embodiment XVI illustrates a schematic diagram of a given access detection being used to determine whether to start transmitting a given wireless signal at a given time in a given sub-band; as shown in FIG. 16.

In Embodiment XVI, the given access detection includes respectively performing X energy detections in X time sub-pools on the given sub-band to obtain X detection values, the X being a positive integer; end time of the time sub-pools is no later than the given time. The given access detection corresponds to the first access detection in the present disclosure; the given time corresponds to the initial transmitting time of the first wireless signal in this disclosure; the given sub-band corresponds to the first sub-band in this disclosure; the predetermined wireless signal corresponds to the first wireless signal in the present disclosure; the X corresponds to the Q in the present disclosure; X1 corresponds to the Q1 in the present disclosure; the first reference threshold corresponds to the first threshold in this disclosure. The given access detection process can be described by the flowchart of FIG. 16.

In FIG. 16, the base station equipment in the present disclosure is in an idle state in step S1001, and in step S1002, determines whether or not transmission is required; in step 1003, energy detection is performed in a defer duration; in S1004, determines whether all the slot periods in the delay period are idle, and if yes, proceeding to step S1005, setting the first counter equal to X1, the X1 is an integer not greater than the X; otherwise, returning to step S1004; S1006 determines whether the first counter is 0, and if yes, in step S1007, transmitting the given wireless signal at the given time in the given sub-band; otherwise proceeds to step S1008, in an additional slot duration perform energy detection; determining whether the additional slot period is idle in step S1009, if yes, proceeding to step S1010, decrement the first counter by one, and then returning to step 1006; otherwise proceeding to step S1011, in an additional defer duration perform energy detection; in step S1012, determine in the additional delay period whether there are idle slot period, if yes, proceeds to step S1010; otherwise, returns to step S1011.

In Embodiment XVI, in FIG. 16, the first counter is cleared to zero before the given time, and the result of the given access detection is an idle channel, and give wireless signal be transmitted at the given time; otherwise the given wireless signal cannot be transmitted at the given time. The condition for zeroing of the first counter is that the X1 detection values of X detection values corresponding to the X1 time sub-pools of the X time sub-pools are all lower than the first reference threshold, the initial time of the X1 time sub-pools in FIG. 16 is after step S1005.

In one embodiment, the X time sub-pools include all of the delay periods in FIG. 16.

In one embodiment, the X time sub-pools include a partial delay period in FIG. 16.

In one embodiment, the X time sub-pools include all delay periods and all additional slot periods in FIG. 16.

In one embodiment, the X time sub-pools include all of the delay periods and a portion of the additional slot periods in FIG. 16.

In one embodiment, the X time sub-pools include all delay periods, all additional slot periods, and all additional delay periods.

In one embodiment, the X time sub-pools include all delay periods, partial additional slot periods, and all additional delay periods in FIG. 16.

In one embodiment, the X time sub-pools include all delay periods, partial additional slot periods, and partial additional delay periods in FIG. 16.

In one embodiment, the duration of any of the X time sub-pools is one of {16 microseconds, 9 microseconds}.

In one embodiment, any one slot duration in a given time period is one time sub-pool of the X time sub-pools; the given time period is any periods of {all delay period, all additional slot duration, and all additional delay periods} included in FIG. 16.

In one embodiment, the execution of energy detection in a given time period refers to the execution of energy detection in all slot duration of the given time period; the given time period is any period of {all delay periods, all additional slot periods, all additional delay periods} included in FIG. 16.

In one embodiment, determining as idle by the energy detection in a given time period means that all slot periods included in the given time period are judged to be idle by energy detection; the given time period is any periods of {all delay periods, all additional slot periods, all additional delay periods} included in FIG. 16.

In one embodiment, determining as idle by the energy detection in a given time period means that the base station equipment senses the power of all wireless signal on the given sub-band in a given time unit, and over time averaging, the obtained receiving power is lower than the first reference threshold; the given time unit is one of the given slot periods.

In a sub-embodiment of the above embodiment, the duration of the given time unit is not shorter than 4 microseconds.

In one embodiment, determining as idle by the energy detection in a given time period means that the base station equipment senses the energy of all wireless signal, and over time averaging, the obtained receiving energy is lower than the first reference threshold; the given time unit is one of the given slot periods.

In a sub-embodiment of the above embodiment, the duration of the given time unit is not shorter than 4 microseconds.

In one embodiment, determining as idle by the energy detection in a given time period means that all the time sub-pools included in the given time period are performed by energy detection; The given time period is any period of the {all delay periods, all additional slots, all additional delay periods} included in FIG. 16, and all the time sub-pools belong to the X time sub-pools.

In one embodiment, determining as idle by the energy detection in a given time period means that: all the time sub-pools included in the given time period are detected by energy detection and the detection values are lower than the first reference threshold; The given time period is any period of the {all delay periods, all additional slots, all additional delay periods} included in FIG. 16, and all the time sub-pools belong to the X time sub pools, The detection value belongs to the X detection values.

In one embodiment, the duration time of a defer duration is 16 microseconds plus Y1 9 microseconds, Y1 is a positive integer.

In a sub-embodiment of the above embodiment, a delay duration includes Y1+1 time sub-pools in the X time sub-pools.

In a reference embodiment of the above sub-embodiment, the duration time of the first time sub-pool in the Y1+1 time sub-pool is 16 microseconds, and the duration time of the other Y1 time sub-pools are all 9 microseconds.

In a sub-embodiment of the above embodiment, the given priority class is used to determine the Y1.

In a sub-embodiment of the above embodiment, the given priority class is a Channel Access Priority Class, and the channel access priority class is defined in section 15 of 3GPP TS 36.213.

In a sub-embodiment of the above embodiment, the Y1 belongs to {1, 2, 3, 7}.

In one embodiment, a defer duration includes multiple slot durations.

In a sub-embodiment of the above embodiment, the first slot duration and the second slot duration in the plurality of slot duration are discontinuous.

In a sub-embodiment of the above embodiment, the time interval between the first slot duration and the second slot duration in the plurality of slot duration is 7 milliseconds.

In one embodiment, the duration time of an additional defer duration is 16 microseconds plus Y2 9 microseconds, Y2 is a positive integer.

In a sub-embodiment of the above embodiment, an additional defer duration includes Y2+1 time sub-pools in the X time sub-pools.

In a sub-embodiment of the above embodiment, the duration time of the first time sub-pool in the Y2+1 time sub-pool is 16 microseconds, and the duration time of the other Y2 time sub-pools is 9 microseconds.

In a sub-embodiment of the above embodiment, the given priority class is used to determine the Y2.

In a sub-embodiment of the above embodiment, the Y2 belongs to {1, 2, 3, 7}.

In one embodiment, the duration time of one defer duration is equal to the duration time of an additional defer duration.

In one embodiment, the Y1 is equal to the Y2.

In one embodiment, an additional defer duration includes multiple slot durations.

In a sub-embodiment of the above embodiment, the first slot duration and the second slot duration in the plurality of slot durations are discontinuous.

In a sub-embodiment of the above embodiment, the time interval between the first slot duration and the second slot duration of the plurality of slot durations is 7 milliseconds.

In one embodiment, the duration time of one slot duration is 9 microseconds.

In one embodiment, one slot duration is one time sub-pool of the X time sub-pools.

In one embodiment, the duration time of one additional slot duration is 9 microseconds.

In one embodiment, one additional slot duration includes one of the X time sub-pools.

In one embodiment, the X-th energy detection is used to determine if the given sub-band is idle.

In one embodiment, the X-th energy detection is used to determine whether the given sub-band can be used by the base station equipment to transmit the given wireless signal.

In one embodiment, the X detection value units are all dBm (millimeters).

In one embodiment, the units of the X detection values are all mW (milliwatts).

In one embodiment, the units of the X detection values are all Joules.

In one embodiment, the X1 is smaller than the X.

In one embodiment, the X is greater than one.

In one embodiment, the unit of the first reference threshold is dBm (millimeters).

In one embodiment, the unit of the first reference threshold is mW (milliwatts).

In one embodiment, the unit of the first reference threshold is joule.

In one embodiment, the first reference threshold is equal to or less than −72 dBm.

In one embodiment, the first reference threshold is any value equal to or less than the first given value.

In a sub-embodiment of the above embodiment, the first given value is predefined.

In a sub-embodiment of the above embodiment, the first given value is configured by higher layer signaling.

In one embodiment, the first reference threshold is freely selected by the base station equipment under conditions equal to or less than a first given value.

In a sub-embodiment of the above embodiment, the first given value is predefined.

In a sub-embodiment of the above embodiment, the first given value is configured by higher layer signaling.

In one embodiment, the X-th energy detection is energy detection during a LBT (Listen Before Talk) process of Cat 4, the X1 being CWp in the LBT process of the Cat 4, the size of the contention window of the CWp. For the specific definition of the CWp, see section 15 in 3GPP TS36.213.

In one embodiment, at least one of the detected values that do not belong to the X1 detection values of the X detection values is lower than the first reference threshold.

In one embodiment, at least one of the detected values that do not belong to the X1 detection values of the X detection values is not lower than the first reference threshold.

In one embodiment, the duration time of any two of the X1 time sub-pools are equal.

In one embodiment, the duration time of at least two time sub-pools in the X1 time sub-pools is not equal.

In one embodiment, the X1 time sub-pools include the latest time sub-pool of the X time sub-pools.

In one embodiment, the X1 time sub-pools only include slot duration in the eCCA.

In one embodiment, the X time sub-pools include the X1 time sub-pools and X2 time sub-pools, and any one of the X2 time sub-pools does not belong to the X1 time sub-pools. The X2 is a positive integer not greater than the X minus the X1.

In a sub-embodiment of the above embodiment, the X2 time sub-pools include slot duration in the initial CCA.

In a sub-embodiment of the above embodiment, the locations of the X2 time sub-pools in the X time sub-pools are continuous.

In a sub-embodiment of the above embodiment, the detection value corresponding to at least one time sub-pool of the X2 time sub-pools is lower than the first reference threshold.

In a sub-embodiment of the above embodiment, the detection value corresponding to at least one time sub-pool of the X2 time sub-pools is not lower than the first reference threshold.

In a sub-embodiment of the above embodiment, the X2 time sub-pools include all slot durations in all defer durations.

In a sub-embodiment of the above embodiment, the X2 time sub-pools include all slot durations in at least one additional defer durations.

In a sub-embodiment of the above embodiment, the X2 time sub-pools include at least one additional slot duration.

In a sub-embodiment of the above embodiment, the X2 time sub-pools include all of the additional slot duration that are determined to be non-idle by energy detection in FIG. 16 and all slot durations within all of the additional delay durations.

In one embodiment, the X1 time sub-pools respectively belong to X1 sub-pool sets, and any one of the X1 sub-pool sets includes a positive integer number of time sub-pools in the X time sub-pools; The detected value corresponding to any one of the X1 sub-pool sets is lower than the first reference threshold.

In a sub-embodiment of the above embodiment, the number of time sub-pools included in the at least one sub-pool set of the X1 sub-pool sets is equal to 1.

In a sub-embodiment of the above embodiment, the number of time sub-pools included in the at least one sub-pool set of the X1 sub-pool sets is grater than 1.

In a sub-embodiment of the above embodiment, the number of time sub-pools included in the at least two sub-pool sets in the X1 sub-pool sets is unequal.

In a sub-embodiment of the above embodiment, a time sub-pool does not exist in the X time sub-pools and belongs to two sub-pool sets in the X1 sub-pool set.

In a sub-embodiment of the above embodiment, all time sub-pools in any one of the X1 sub-pool sets belong to the same additional defer duration or additional slot duration determined to be idle by energy detection.

In a sub-embodiment of the above embodiment, the detected value corresponding to at least one time sub-pool in the time sub-pool that does not belong to the X1 sub-pool set in the X time sub-pools is lower than the first reference threshold.

In a sub-embodiment of the above embodiment, the detected value corresponding to at least one time sub-pool in the time sub-pool that does not belong to the X1 sub-pool set in the X time sub-pools is not lower than the first reference threshold.

Embodiment XVII

Figure 17:
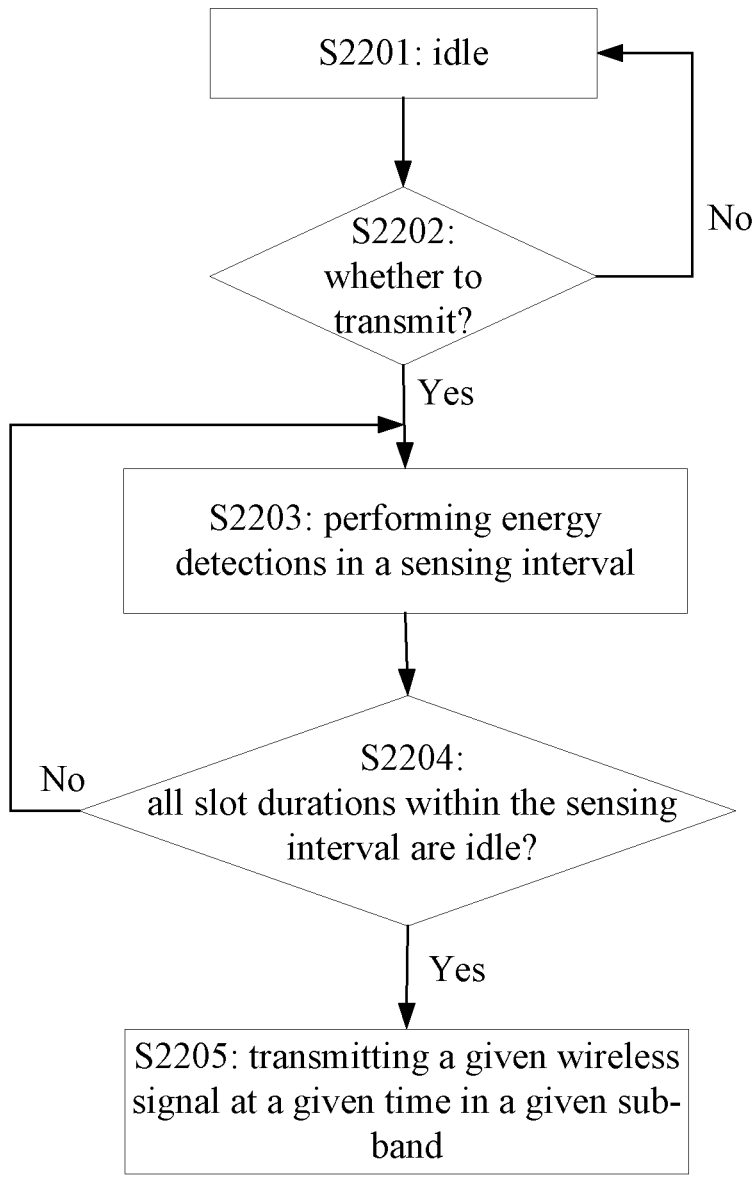
FIG. 17 shows a schematic diagram of a given access detection according to another embodiment of the present disclosure is used to determine whether to start transmitting a given wireless signal at a given time in a given sub-band.

Embodiment XVII illustrates a schematic diagram of another given access detection used to determine whether to begin transmitting a given wireless signal at a given time in a given sub-band; as shown in FIG. 17.

In Embodiment XVII, the given access detection includes performing X-th of energy detection in X time sub-pools on the given sub-band, respectively, to obtain X detection values, the X being a positive integer; End time of the time sub-pools is no later than the given time. The access given detection in the present disclosure corresponds to a first access detection; a given time corresponding to the initial transmitting time of the first wireless signal in the present disclosure; the given sub-band corresponding to the first sub-band in this disclosure; the given wireless signal corresponds to the first wireless signal in the disclosure; the X corresponds to the Q in the disclosure; X1 corresponds to the Q1 in this disclosure. The process of the given access detection can be described by the flowchart in FIG. 17.

In the embodiment XVII, in step S2201, the user equipment in the present disclosure is in an idle state, and in step S2202 determined whether or not transmission is required; in step 2203, energy detection is performed in a sensing interval; In S2204, determined whether all the slot duration in this sensing interval are idle, and if so, proceeding to step S2205 to transmit the given wireless signal at the given time in the given sub-band; otherwise, returning to step S2203.

In Embodiment XVII, the first given time period includes a positive integer number of time sub-pools in the X time sub-pools, and the first given time period is any period time of {all sensing time} included in FIG. 17. A time period in the X1 time sub-pools included in the second given time period, and the second given time period is the sensing time judged to be idle (Idle) by energy detection in FIG. 17.

In one embodiment, the specific definition of the perceptual time is described in section 15.2 of 3GPP TS 36.213.

In one embodiment, the X1 is equal to two.

In one embodiment, the X1 is equal to the X.

In one embodiment, the duration time of a sensing interval is 25 microseconds.

In one embodiment, one sensing interval includes two slot durations, the two slot durations being discontinuous in the time domain.

In a sub-embodiment of the above embodiment, the time interval in the two slot durations is 7 microseconds.

In one embodiment, the X time sub-pools include a motoring time in a Category 2 LBT.

In one embodiment, the X time sub-pools include slots in a sensing interval of a Type 2 UL channel access procedure, the specific definition of the sensing time interval can be found in chapter 15.2 of 3GPP TS 36.213.

In a sub-embodiment of the above embodiment, the duration time of the sensing time interval is 25 microseconds.

In one embodiment, the X time sub-pools include Tf and Tsl in a sensing interval in a Type 2 UL channel access procedure, the specific definition of the Tf and Tsl can be referred to section 15.2 of 3GPP TS 36.213.

In a sub-embodiment of the above embodiment, the duration time of the Tf is 16 microseconds.

In a sub-embodiment of the above embodiment, the duration time of the Tsl is 9 microseconds.

In an embodiment, the duration time of the first time sub-pool in the X1 time sub-pools is 16 microseconds, and the duration time of the second time sub-pool in the X1 time sub-pools is 9 microseconds, the X1 is equal to 2.

In one embodiment, the duration time of the X1 time sub-pools is 9 microseconds; the time interval between the first time sub-pool and the second time sub-pool in the X1 time sub-pools is 7 microseconds, the X1 is equal to 2.

Embodiment XVIII

Figure 18:
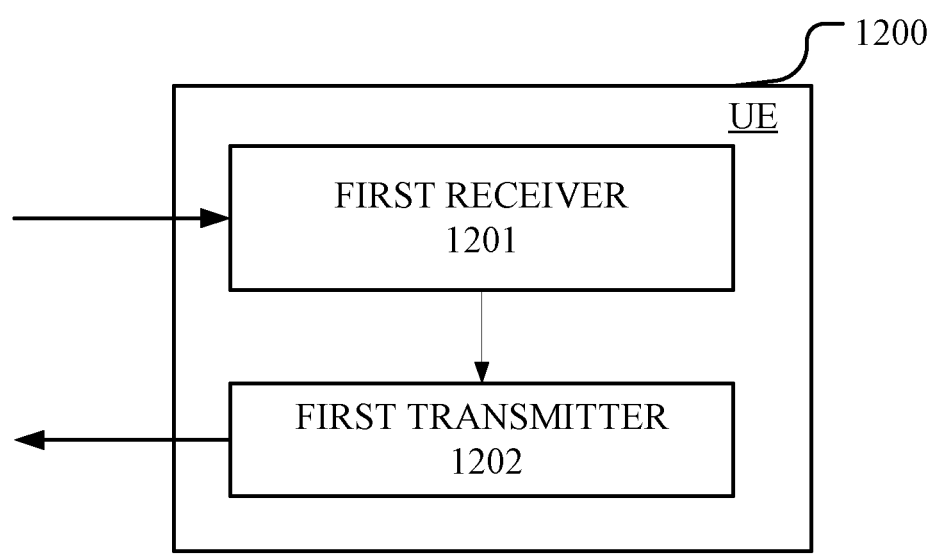
FIG. 18 shows a block diagram of the structure of a processing device in a UE according to an embodiment of the present disclosure.

Embodiment XVIII exemplifies a structural block diagram of a processing device in one UE, as shown in FIG. 18. In FIG. 18, the UE processing device 1200 is mainly composed of a first receiver 1201 and a first transmitter 1202.

In one embodiment, the first receiver 1201 includes the receiver 456, the receiving processor 452, and the controller/processor 490 in Embodiment IV.

In one embodiment, the first receiver 1201 includes at least first two of the receiver 456, the receiving processor 452, and the controller/processor 490 in Embodiment IV.

In one embodiment, the first transmitter 1202 includes a transmitter 456, a transmit processor 455, and a controller/processor 490 in Embodiment IV.

In one embodiment, the first transmitter 1202 includes at least the first two of the transmitter 456, the transmit processor 455, and the controller/processor 490 in Embodiment IV.

a first receiver 1201: receiving a first information, the first information being used to indicate a first parameter, the first parameter being associated to one of L spatial parameter sets, the L spatial parameter sets respectively in one-to-one corresponds to L time domain resources, and L is a positive integer greater than 1.

a first transmitter 1202: transmitting a first wireless signal in a first time domain resource of a first sub-band, the first time domain resource is one of the L time domain resources.

In Embodiment XVIII, the first information is used to determine the first time domain resource from the L time domain resources, and the first parameter is used to determine a transmitting antenna port group of the first wireless signal, the antenna port group being composed of a positive integer number of antenna port(s).

In one embodiment, the first receiver 1201 further performs a first access detection; wherein the first access detection is used to determine the first wireless transmitted in the first time domain resource of the first sub-band, end time of the first access detection is not later than initial transmitting time of the first wireless signal.

In one embodiment, a first spatial parameter set is one of the L spatial parameter sets to which the first parameter is associated, the first time domain resource is a time domain resource which corresponded to the first spatial parameter set in the L time domain resources.

In one embodiment, the first receiver 1201 further receives a second information; wherein the second information is used to indicate the L spatial parameter sets.

In one embodiment, the first receiver 1201 further receives a third information; wherein the third information is used to determine M time windows, the first time window is one of the M time windows, M is a positive integer greater than one.

In one embodiment, the third information and time domain location of the first time window are used together to determine a one-to-one correspondence between the L spatial parameter sets and the L time domain resources.

In one embodiment, the first receiver 1201 also selects the first time window by itself from the M time windows.

In one embodiment, the first receiver 1201 further receives a fourth information, wherein, the fourth information is used to indicate the frequency domain resource occupied by the first wireless signal.

In one embodiment, the first receiver 1201 further receives a fifth information; wherein, the fifth information is used to indicate whether the first wireless signal is correctly received.

Embodiment XIX

Figure 19:
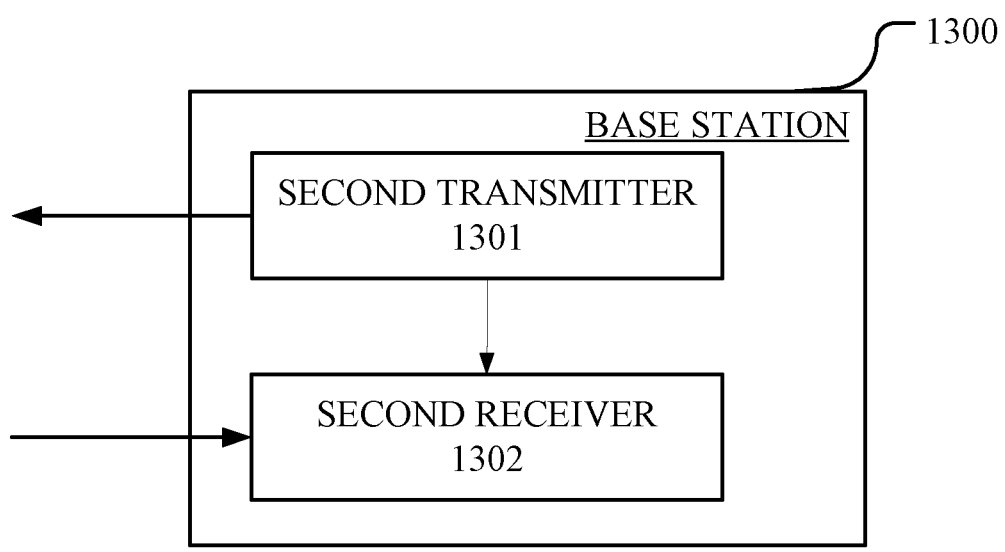
FIG. 19 shows a block diagram of the structure of a processing device in a base station equipment according to an embodiment of the present disclosure.

Embodiment XIX exemplifies a structural block diagram of a processing device in a base station equipment, as shown in FIG. 19. In FIG. 19, the processing device 1300 in the base station equipment is mainly composed of a second transmitter 1301 and a second receiver 1302.

In a sub-embodiment, the second transmitter 1301 includes the transmitter 416, the transmission processor 415, and the controller/processor 440 in Embodiment IV.

In a sub-embodiment, the second transmitter 1301 includes at least first two of the transmitter 416, the transmit processor 415, and the controller/processor 440 in Embodiment IV.

In a sub-embodiment, the second receiver 1303 includes a receiver 416, a receiving processor 412, and a controller/processor 440 in Embodiment IV.

In a sub-embodiment, the second receiver 1303 includes at least the first two of the receiver 416, the receiving processor 412, and the controller/processor 440 in Embodiment IV.

a second transmitter 1301, transmitting a first information, the first information being used to indicate a first parameter, the first parameter being associated to one of L spatial parameter sets, the L spatial parameter sets respectively in one-to-one corresponds to L time domain resources, and L is a positive integer greater than 1.

a second receiver 1302, monitoring a first wireless signal in a first sub-band, receiving the first wireless signal in a first time domain resource of the first sub-band, the first time domain resource is a time domain resource in the L time domain resources.

In Embodiment XIX, the first information is used to determine the first time domain resource from the L time domain resources, and the first parameter is used to determine a transmitting antenna port group of the first wireless signal, the antenna port group is composed of a positive integer number of antenna port(s).

In one embodiment, the transmitter of the first wireless signal performs a first access detection, the first access detection is used to determine to transmit the first wireless signal transmitted in the first time domain resource of the first sub-band, end time of the first access detection is not later than initial transmitting time of the first wireless signal.

In one embodiment, a first spatial parameter set is one of the L spatial parameter sets to which the first parameter is associated, the first time domain resource is a time domain resource which corresponded to the first spatial parameter set in the L time domain resources.

In one embodiment, the second transmitter 1301 further transmits a second information; wherein the second information is used to indicate the L spatial parameter sets.

In one embodiment, the second transmitter 1301 further transmits a third information; wherein the third information is used to determine M time windows, the first time window is one of the M time windows, M being a positive integer greater than one.

In one embodiment, the third information and time domain location of the first time window are used together to determine a one-to-one correspondence between the L spatial parameter sets and the L time domain resources.

In one embodiment, the transmitter of the first wireless signal selects the first time window by itself from the M time windows.

In one embodiment, the second transmitter 1301 further sends a fourth information, the fourth information is used to indicate the frequency domain resource occupied by the first wireless signal.

In one embodiment, the second transmitter 1301 further transmits a fifth information; wherein the fifth information is used to indicate whether the first wireless signal is correctly received.

One of ordinary skill in the art can appreciate that all or part of the above steps can be completed by a program to instruct related hardware, and the program can be stored in a computer readable storage medium such as a read only memory, a hard disk or an optical disk. Alternatively, all or part of the steps of the above embodiments may also be implemented using one or more integrated circuits. Correspondingly, each module unit in the above embodiment may be implemented in hardware form or in the form of a software function module. The application is not limited to any specific combination of software and hardware. The user equipment, terminal and UE in the present disclosure include but are not limited to a drone, a communication module on the drone, a remote control aircraft, an aircraft, a small aircraft, a mobile phone, a tablet computer, a notebook, a vehicle communication device, a wireless sensor, an internet card, Internet of Things terminal, RFID terminal, NB-IOT terminal, MTC (Machine Type Communication) terminal, eMTC (enhanced MTC), data card, network card, vehicle communication device, low-cost mobile phone, low Cost equipment such as tablets. The base station in the present disclosure includes, but is not limited to, a macro communication base station, a micro cell base station, a home base station, a relay base station, a gNB (NR Node B), a TRP (Transmitter Receiver Point), and the like.

Although the present disclosure is illustrated and described with reference to specific embodiments, those skilled in the art will understand that many variations and modifications are readily attainable without departing from the spirit and scope thereof as defined by the appended claims and their legal equivalents.

What is claimed is:

1. A method for wireless communication in a user equipment (UE), comprising:
   receiving a first information, wherein the first information is used to indicate a first parameter, the first parameter is associated with one of L spatial parameter sets, and the L spatial parameter sets are respectively in one-to-one correspondence with L time domain resources, where L is a positive integer greater than one; and
   transmitting a first wireless signal in a first time domain resource of a first sub-band, wherein the first time domain resource is one of the L time domain resources; wherein the first sub-band includes a frequency domain resource occupied by the first wireless signal, wherein the L time domain resources belong to a first time window, and the first information is used to determine the first time domain resource from the L time domain resources, the first parameter is used to determine transmitting antenna port group of the first wireless signal, and the antenna port group is composed of a positive integer number of antenna port(s).

2. The method of claim 1, wherein any two of the L time domain resources overlap each other in the time domain.

3. The method of claim 1, comprising:
   performing a first access detection;
   wherein the first access detection is used to determine that the first wireless signal is transmitted in the first time domain resource of the first sub-band, and end time of the first access detection is not later than initial transmitting time of the first wireless signal.

4. The method of claim 1, wherein a first spatial parameter set is one of the L spatial parameter sets to which the first parameter is associated; the first time domain resource is one of the L time domain resources corresponding to the first spatial parameter set.

5. The method of claim 1, further comprising:
   receiving a second information, or receiving a fourth information, or receiving a fifth information;
   wherein the second information is used to indicate the L spatial parameter sets; the fourth information is used to indicate the frequency domain resource occupied by the first wireless signal; the fifth information is used to indicate whether the first wireless signal is correctly received.

6. The method of claim 1, further comprising:
   receiving a third information;
   wherein the third information is used to determine M time windows; the first time window is one of the M time windows; M is a positive integer greater than 1; the third information and time domain location of the first time window are used together to determine a one-to-one correspondence between the L spatial parameter sets and the L time domain resources, or, self-selecting the first time window from the M time windows.

7. A method for wireless communication in a base station equipment, comprising:
   transmitting a first information, wherein the first information is used to indicate a first parameter, the first parameter is associated to one of L spatial parameter sets, and the L spatial parameter sets are respectively in one-to-one correspondence with L time domain resources, L is a positive integer greater than one; and
   monitoring a first wireless signal in a first sub-band, and receiving the first wireless signal in a first time domain resource of the first sub-band, the first time domain resource is one of the L time domain resources;
   wherein the first sub-band includes a frequency domain resource occupied by the first wireless signal; the L time domain resources belong to a first time window; the first information is used to determine the first time domain resource from the L time domain resources; the first parameter is used to determine transmitting antenna port group of the first wireless signal; the antenna port group is composed of a positive integer number of antenna port(s).

8. The method of claim 7, wherein any two of the L time domain resources overlap each other in the time domain.

9. The method of claim 7, comprising:
transmitting a second information, or transmitting a fourth information, or transmitting a fifth information;
wherein the second information is used to indicate the L spatial parameter sets; the fourth information is used to indicate the frequency domain resource occupied by the first wireless signal; the fifth information is used to indicate whether the first wireless signal is correctly received.

10. The method of claim 7, further comprising:
transmitting a third information;
wherein the third information is used to determine M time windows; the first time window is one of the M time windows, M is a positive integer greater than 1; the third information and time domain location of the first time window are used together to determine a one-to-one correspondence between the L spatial parameter sets and the L time domain resources; or transmitter of the first wireless signal itself selects the first time window from the M time windows.

11. A user equipment (UE) for wireless communication, comprising:
a first receiver receiving a first information, wherein the first information is used to indicate a first parameter; the first parameter is associated to one of L spatial parameter sets, the L spatial parameter sets are respectively in one-to-one correspondence with L time domain resources; L is a positive integer greater than one; and
a first transmitter transmitting a first wireless signal in a first time domain resource of a first sub-band, the first time domain resource is one of the L time domain resources;
wherein the first information is used to determine the first time domain resource from the L time domain resources; the first parameter is used to determine a transmitting antenna port group of the first wireless signal; the antenna port group is composed of a positive integer number of antenna port(s).

12. The UE of claim 11, wherein any two of the L time domain resources overlap each other in the time domain.

13. The UE of claim 11, comprising:
performing a first access detection;
wherein the first access detection is used to determine that the first wireless signal is transmitted in the first time domain resource of the first sub-band, and end time of the first access detection is not later than initial transmitting time of the first wireless signal.

14. The UE of claim 11, wherein a first spatial parameter set is one of the L spatial parameter sets to which the first parameter is associated; the first time domain resource is one of the L time domain resources corresponding to the first spatial parameter set.

15. The UE of claim 11, further comprising:
receiving a second information, or receiving a fourth information, or receiving a fifth information;
wherein the second information is used to indicate the L spatial parameter sets; the fourth information is used to indicate the frequency domain resource occupied by the first wireless signal; the fifth information is used indicate whether the first wireless signal is correctly received.

16. The UE of claim 11, further comprising:
receiving a third information;
wherein the third information is used to determine M time windows; the first time window is one of the M time windows; M is a positive integer greater than one; the third information and time domain location of the first time window are used together to determine a one-to-one correspondence between the L spatial parameter sets and the L time domain resources; or self-selecting the first time window from the M time windows.

17. A base station equipment for wireless communication, comprising:
a second transmitter transmitting a first information, wherein the first information is used to indicate a first parameter; the first parameter is associated with one of L spatial parameter sets; the L spatial parameter sets are respectively corresponding to L time domain resources; L is a positive integer greater than one; and
a second receiver monitoring a first wireless signal in a first sub-band, and receiving the first wireless signal in a first time domain resource of the first sub-band, wherein the first time domain resource is one of the L time domain resources;
wherein the first information is used to determine the first time domain resource from the L time domain resources; the first parameter is used to determine transmitting antenna port group of the first wireless signal; the antenna port group is composed of a positive integer number of antenna port(s).

18. The base station equipment of claim 17, wherein any two of the L time domain resources overlap each other in the time domain.

19. The base station equipment of claim 17, comprising:
transmitting a second information, or transmitting a fourth information, or transmitting a fifth information;
wherein the second information is used to indicate the L spatial parameter sets; the fourth information is used to indicate the frequency domain resource occupied by the first wireless signal; the fifth information is used to indicate whether the first wireless signal is correctly received.

20. The base station equipment of claim 17, further comprising:
transmitting a third information;
wherein the third information is used to determine M time windows; the first time window is one of the M time windows; M is a positive integer greater than one; the third information and time domain location of the first time window are used together to determine a one-to-one correspondence between the L spatial parameter sets and the L time domain resources; or transmitter of the first wireless signal itself selects the first time window from the M time windows.

* * * * *